United States Patent [19]

Okada et al.

[11] Patent Number: 5,289,004
[45] Date of Patent: Feb. 22, 1994

[54] SCANNING PROBE MICROSCOPE HAVING CANTILEVER AND DETECTING SAMPLE CHARACTERISTICS BY MEANS OF REFLECTED SAMPLE EXAMINATION LIGHT

[75] Inventors: Takao Okada, Hachioji; Akira Yagi, Sagamihara; Yasuhiro Sugawara, Hiroshima; Seizo Morita, Miyanomachi; Tsugiko Takase, Hachioji, all of Japan

[73] Assignee: Olympus Optical Co., Ltd., Tokyo, Japan

[21] Appl. No.: 866,748

[22] Filed: Apr. 10, 1992

Related U.S. Application Data

[63] Continuation-in-part of Ser. No. 672,857, Mar. 20, 1991, abandoned.

[30] Foreign Application Priority Data

Mar. 27, 1990 [JP] Japan ............................. 2-79567
Nov. 21, 1991 [JP] Japan ............................. 3-305998

[51] Int. Cl.$^5$ ............................................ H01J 37/00
[52] U.S. Cl. ............................... 250/306; 250/423 F
[58] Field of Search ................... 250/306, 307, 423 F; 73/105

[56] References Cited

U.S. PATENT DOCUMENTS

| | | | |
|---|---|---|---|
| 4,343,993 | 8/1982 | Binnig et al. | 250/306 |
| 4,665,313 | 5/1987 | Wells | 250/306 |
| 4,724,318 | 2/1988 | Binnig | 250/306 |
| 4,747,698 | 5/1988 | Wickramasinghe | 374/6 |
| 4,870,352 | 9/1989 | Koechner | 250/310 |
| 4,914,293 | 4/1990 | Hayashi et al. | 250/306 |
| 4,939,363 | 7/1990 | Bando et al. | 250/306 |
| 4,941,753 | 7/1990 | Wickramasinghe | 374/120 |
| 5,036,196 | 7/1991 | Hosaka et al. | 250/306 |

FOREIGN PATENT DOCUMENTS

| | | |
|---|---|---|
| 0245660 | 4/1987 | European Pat. Off. |
| 90/10304 | 1/1990 | PCT Int'l Appl. |

OTHER PUBLICATIONS

Rev. Sc. Instrum. 61 (6), Jun. 1990; "A Scanning Tunneling Microscopy/Spectroscopy System ... ", pp. 1664–1667.

Jap. Journal of Applied Physics, Nov. 1989, No. 11, Part 2, "Scanning Tunneling Potentiometry ... ", pp. 2034–2036.

Journal of Vacuum Science & Technology A; vol. 8, No. 1, Jan./Feb. 1990; pp. 336–338.

Journal of Microscopy, vol. 152, Pt. 3, Dec. 2988, pp. 871–875.

IBM Technical Disclosure Bulletin, vol. 32, No. 8B, Jan. 1990; pp. 106–108.

Journal of Vac. Science & Technology A, vol. 8, No. 1, Jan./Feb. 1990; "High-temperature Scanning Tunneling ... "; pp. 327–329.

(List continued on next page.)

*Primary Examiner*—Jack I. Berman
*Assistant Examiner*—Jim Beyer
*Attorney, Agent, or Firm*—Frishauf, Holtz, Goodman & Woodward

[57] ABSTRACT

A scanning probe microscope comprises a cantilever having a conductive probe positioned near a sample, an actuator for moving the sample to and away from the probe, a circuit for applying a bias voltage between the probe and sample to produce a tunnel current therebetween, a circuit for detecting the produced tunnel current, a circuit for detecting the amount of displacement of the probe resultant from interatomic forces acting between atomics of the probe and sample, thereby producing signals, a circuit for providing the actuator for feedback in response to the output signals from the circuit to retain constant the distance between the probe and sample, thereby causing the actuator to move the sample, a circuit for forming an STS image data from the detected tunnel current, a circuit for forming an STM image data from the detected tunnel current, and a circuit for forming an AFM image data. Thus, the STS, STP and AFM images are separately obtained simultaneously.

19 Claims, 17 Drawing Sheets

OTHER PUBLICATIONS

Appl. Phys. Lett. 52, vol. 26, Jun. 1988, "Scanning Tunneling and Atomic Force Microscopy Combined", pp. 2233–2235.

Physical Review Letters, vol. 54, No. 22, Jun. 3, 1985; "Spatial Variations in the Superconductivity of $Nb_3Sn$ Measured by Low-Temperature Tunneling Microscopy;" Lozanne et al.

Physical Review Letters, vol. 56, No. 18: May 5, 1986; "Surface Electronic Structure of Si(111)–(7×7) Resolved in Real Space"; Hamers et al.

Physical Review Letters; vol. 60, No. 12, Mar. 21, 1988; "Atomic Arrangement of Sulfur Adatoms on Mo(001) at Atmospheric Pressure: A Scanning Tunneling Microscopy Study"; Marchon et al.

J. Vac. Sci. Technol. A6(2), Mar./Apr. 1988; "Scanning Tunneling Spectroscopy Study on Graphite and $2H-NbSe_2$"; Bando et al.

IBM J. Res. Develop. vol. 30, No. 4, Jul. 1986; "Spectroscopy of electronic states of metals with a scanning tunneling microscope"; Kaiser et al; pp. 411–416.

IBM J. Res. Develop., vol. 30, No. 4, Jul. 1986; "Scanning Tunneling Microscopy"; Binnig et al; pp. 355–369.

Rev. Sci. Instrum. 60(2), Feb. 1989; "Scanning Tunneling Microscope Instrumentation"; Kuk et al; pp. 165–180.

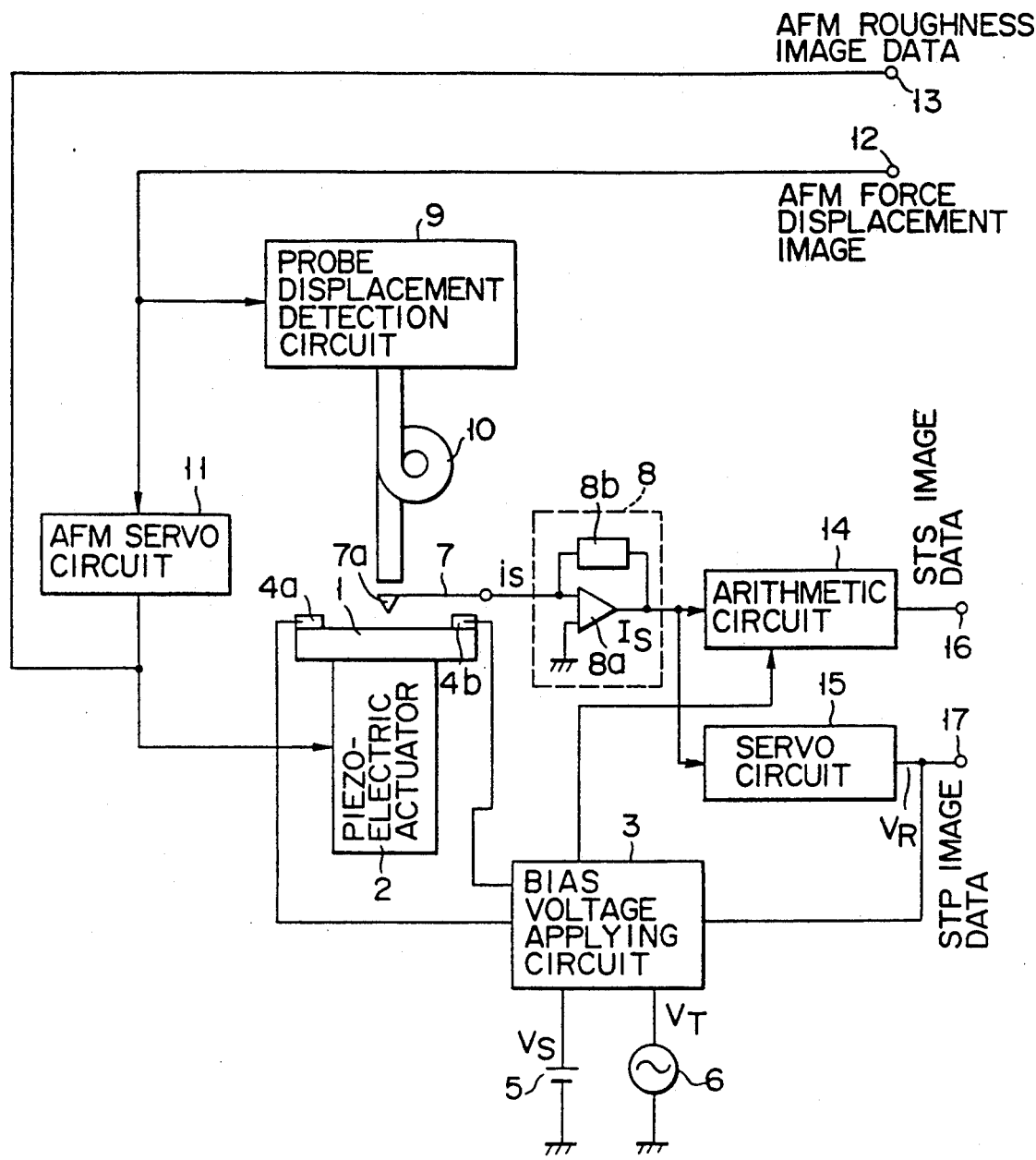
F I G. 1

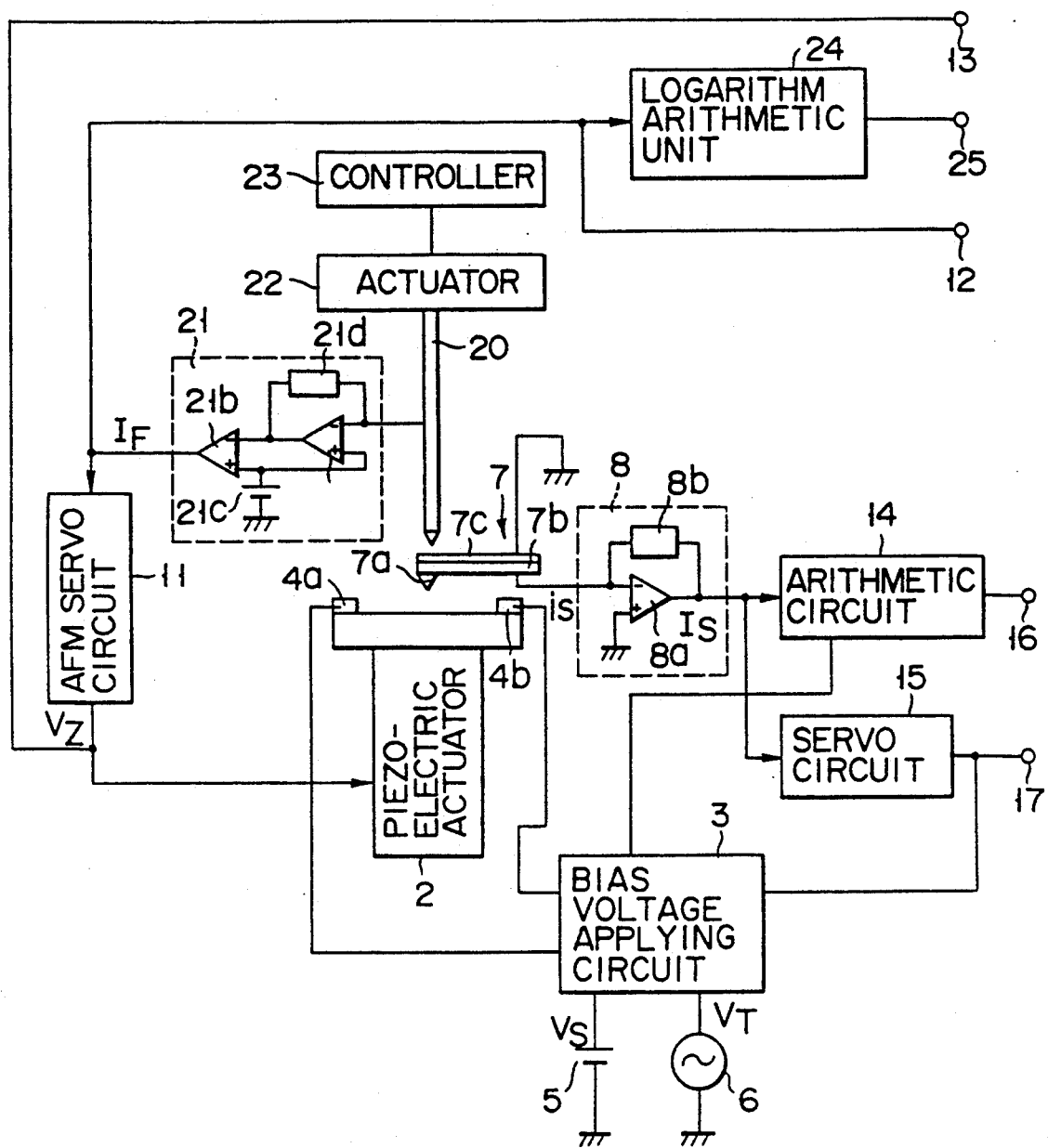
F I G. 2
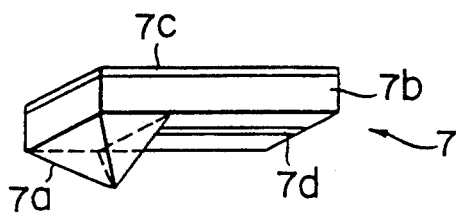
F I G. 3

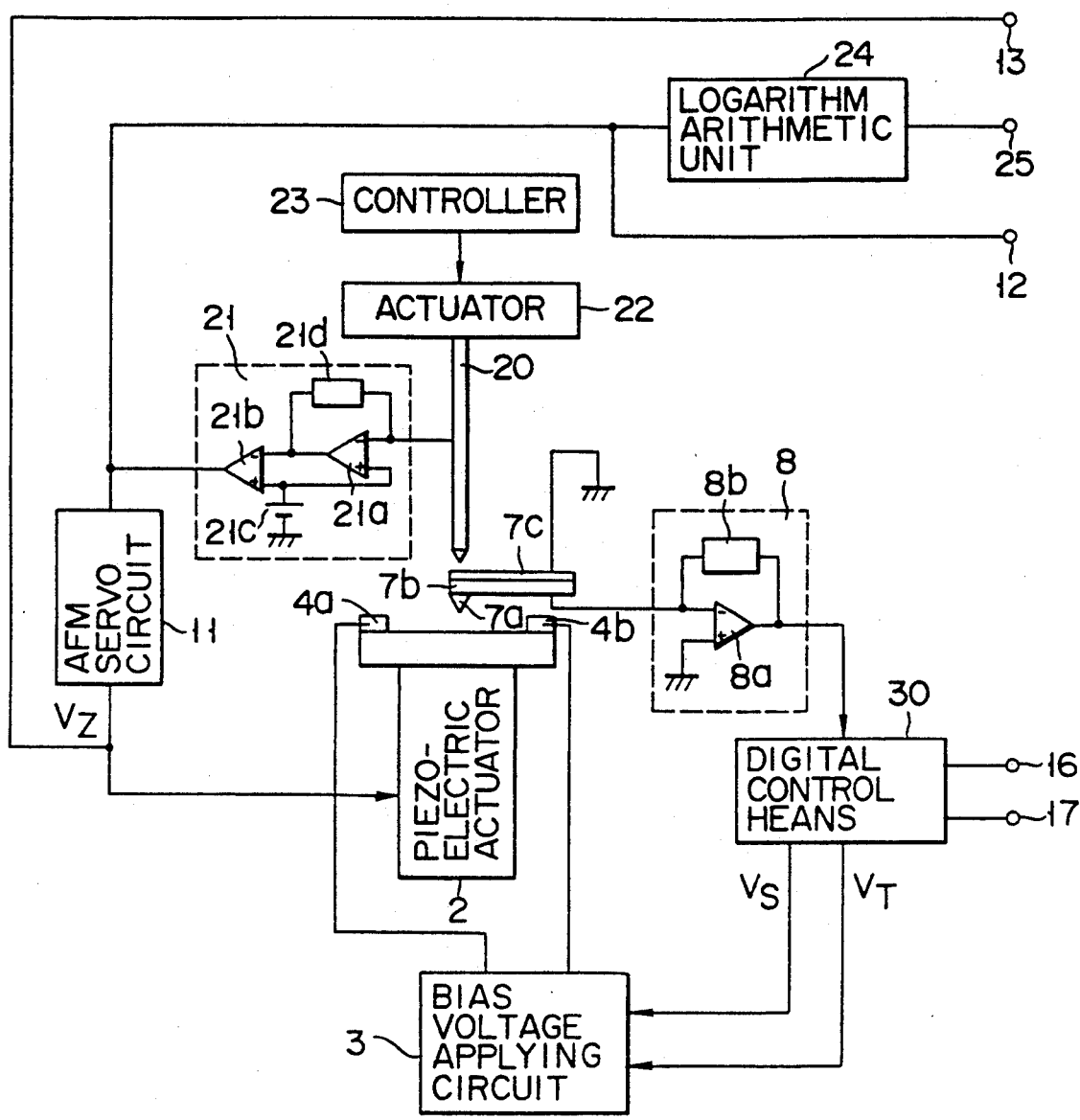
F I G. 4

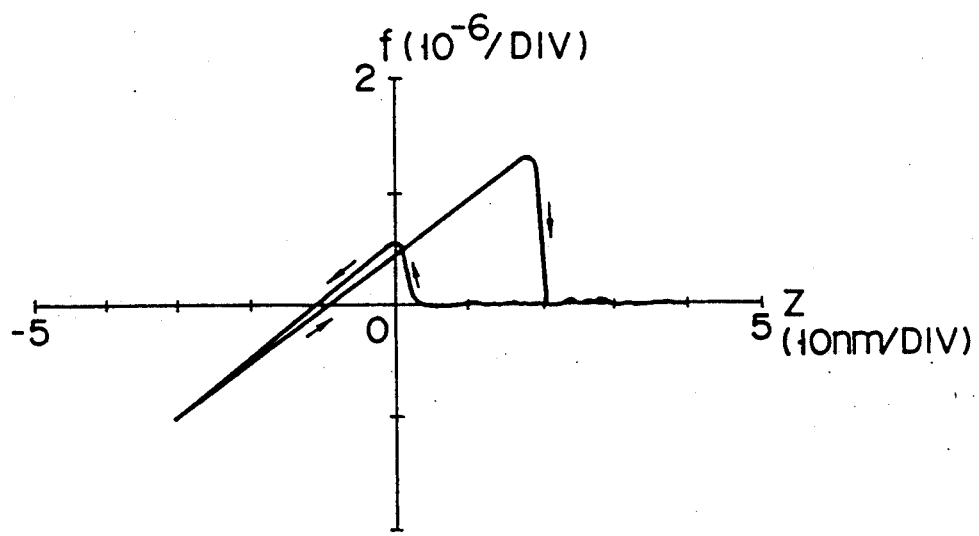
F I G. 5A
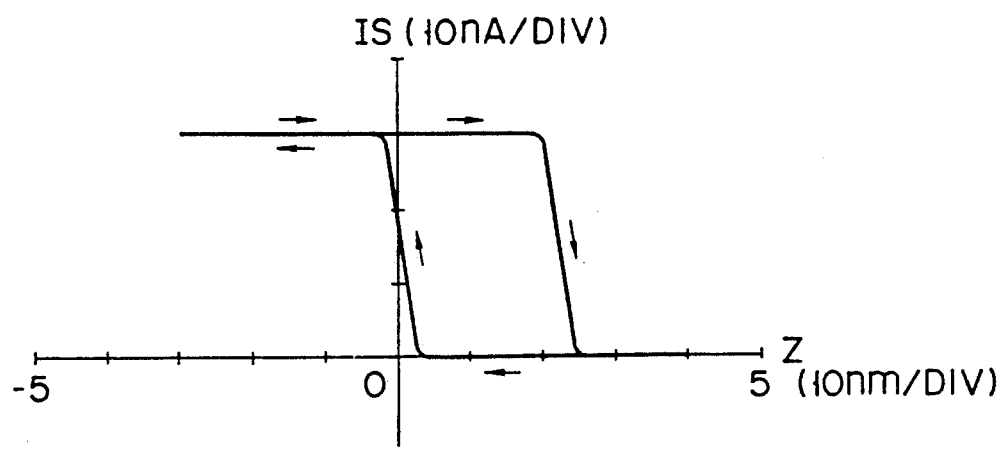
F I G. 5B

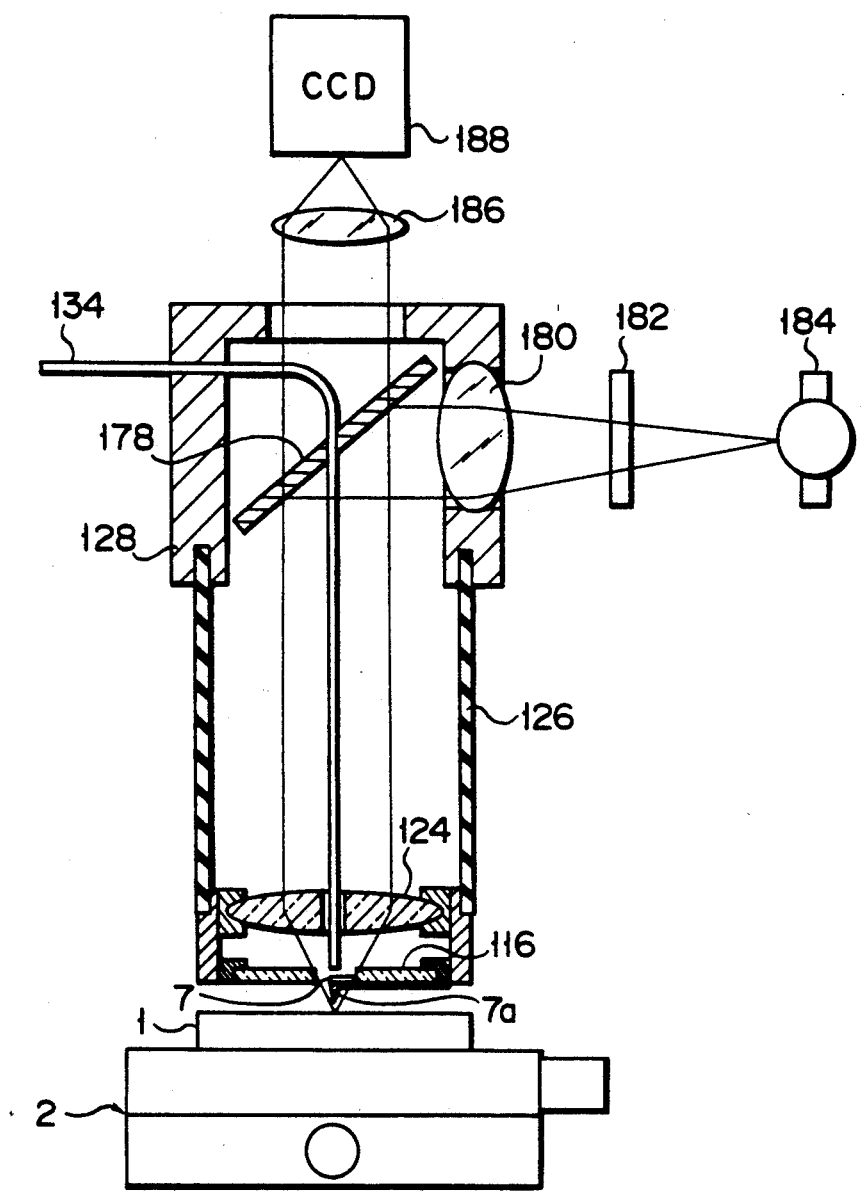
F I G. 17

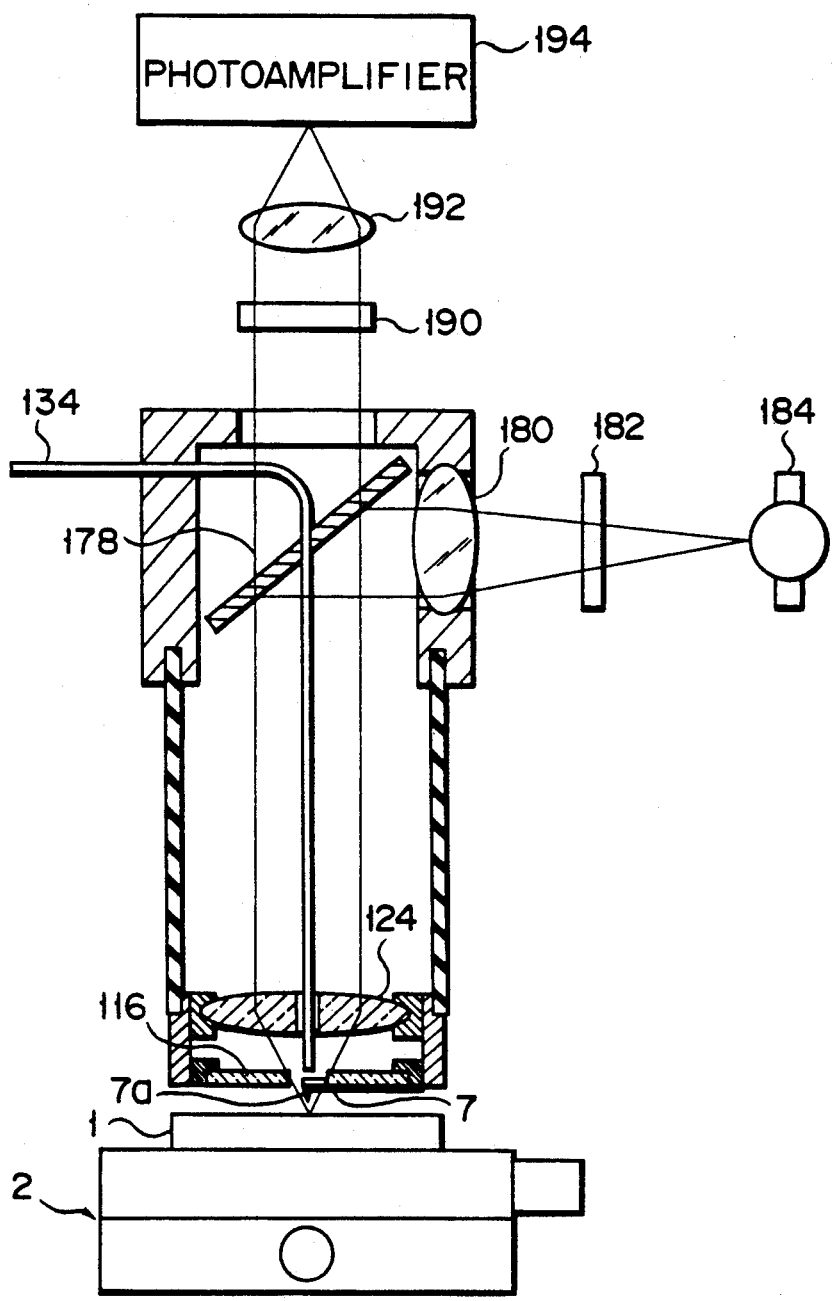
F I G. 18

SCANNING PROBE MICROSCOPE HAVING CANTILEVER AND DETECTING SAMPLE CHARACTERISTICS BY MEANS OF REFLECTED SAMPLE EXAMINATION LIGHT

CROSS-REFERENCE TO THE RELATED APPLICATIONS

This application is a continuation-in-part of U.S. patent application Ser. No. 672,857, filed on Mar. 20, 1991, now abandoned.

BACKGROUND OF THE INVENTION

1. Field of the Invention

The present invention relates to a scanning probe microscope for measuring information of the surface of a sample scanning the surface of said sample with a probe as the latter is brought close to said surface, and in particular to a scanning probe microscope which is capable of obtaining different information on the surface of the same sample simultaneously.

2. Description of the Related Art

A scanning tunneling microscope (hereinafter called STM device), atomic force microscope (hereinafter called AFM device) and the like have recently been developed as an apparatus that can observe the very small configuration on the surface of a sample at an atomic level, so that these apparatuses may be used in various studies or in research.

The STM device is used, as disclosed in U.S. Pat. No. 4,343,993, to measure the configuration of surface of a sample in the resolution on an atomic level; this particular measurement process basically utilizes a tunnel current I which depends on the distance S between the probe and sample and a tunnel barrier height ($I = \exp(-\phi^{\frac{1}{2}}S)$) as the probe is placed near the sample of a conductive material by a distance of several nm, which process involves measurement of a control voltage with which the positional relation of the probe and the sample is controlled so as to render constant the tunnel current I as the probe is scanned.

The AFM device is disclosed in U.S. Pat. No. 4,724,318 (Japanese Unexamined Patent Application 62-130302), in which in contrast with said STM device, measurement can be made, independent of the electric conductivity of a sample used, in the resolution on an atomic level by detecting in view of the amount of deflection (the amount of displacement of a probe) of a cantilever (fulcrum) to which the probe is attached a very small force called the interatomic force (repulsive force, van der Waals force, covalent bond force) which has been produced between atoms in the tip of the probe and in the sample surface and measuring a control voltage with which the positional relation between the probe and sample is controlled so as to render the force constant as the probe is being scanned, whereby the configuration of surface of the sample and a distribution image of mutual action can be measured in the resolution on an atomic level. In this connection, the interatomic force can be represented by a Lennard-Jones potential having attraction and repulsive force areas, as shown in FIG. 10, between the atoms in the top of the probe and in the sample surface.

With said STM device, the distance between the probe and sample, the local charge state density of the sample, and the local potential of the sample are reflected on a tunnel current to be detected. That is, normal STM images include information of microscopic surface roughness of the sample, information of the local charge density of states and information of local potential distribution in the sample surface. In this connection, there have been recently developed the scanning tunneling spectroscopy (hereinafter referred to as STS) and scanning tunneling potentiometry (hereinafter referred to as STP). In STS, a three-dimensional image (STS image) is obtained by steps of separating information of the surface roughness of the sample and information of electronic physical properties in the sample surface from tunnel currents, and extracting information of the electronic state of the sample surface. In STP, a three-dimensional image (STP image) is obtained by extracting information of potential distribution in the sample surface from tunnel current flows. The applicants of this application have already filed U.S. patent application Ser. No. 07/585,880 (EPC patent application No. 90118507.4) directed to an apparatus which enables simultaneous obtainment of STS and STP images.

Of late, special attention is devoted to more strict study of the surface physical properties based on measurement of physical information about the sample surfaces.

P. J. Bryant has discussed a system for performing simultaneous measurement of STM and AFM images in the articles, in pages 871 to 875, in the Journal of Microscopy Vol. 152, Pt 3, Dec. 1988.

FIG. 9 shows a measurement system 50 as described in this article. The system has a flexible and resilient cantilever 52 and a metallic probe 53 which are disposed on the lower side of a triaxial piezoelectric drive 51 which can drive in three XYZ directions, with the free end of the probe being positioned in the vicinity of the rear side of the cantilever 50. The free end of the cantilever 52 is formed with an acute tip 54, which is positioned near the surface of a specimen 55. An STM bias applying means 56 and an AFM bias applying means 57 are provided in such a manner that an STM bias voltage $V_S$ is applied between the cantilever 52 and the specimen 55 and an AFM bias voltage $V_A$ will be applied between the cantilever 52 and the metallic probe 53. Such impressions of the STM bias voltage $V_S$ and AFM bias voltage $V_A$ give rise to tunnel current flows between the cantilever 52 and specimen 55, and the cantilever 52 and metallic probe 53 respectively. Namely, an electric current $i_{AS}$ flows in the cantilever 52, which is resulting from the addition of a current $i_S$ flowing between the cantilever 52 and the specimen 55, and a current $i_A$ flowing between the cantilever 52 and the metallic probe 53. The current $i_{AS}$ is fed to a control circuit 58 and a computer 59. In an attempt to keep this current $i_{AS}$ constant, i.e. to keep constant a force acting between the cantilever 52 and the specimen 55, a feedback voltage is applied to the Z-direction piezoelectric member of the triaxial piezoelectric drive 51. Under this condition, by recording a feedback voltage used when the probe 53 and the cantilever 52 are scanned in the XY-directions against the specimen 55 simultaneously, AFM images (roughness images) of the specimen surface are measured in a moment of a force acting between the cantilever 52 and the specimen 55 being rendered constant, and which images are displayed on an AFM image display means 60.

On the other hand, the current $i_{AS}$ fed to the computer 59 is processed by the computer 59 to obtain a current $i_S$ and consequential recording of this current is in synchronization with scanning signals results in obtainment of STM images of the specimen surface, thereby being displayed on an STM image display means 61.

However, this prior art can only obtain STM and AFM images. Nothing is disclosed about obtainment of said STS and STP images after procurement of information of local charge density of states, and local potential distribution.

Also, with said prior applications, there is a description of the simultaneous obtainment of STS and TP images, but nothing is set forth about the simultaneous obtainment of AFM images together with the STS and STP images.

SUMMARY OF THE INVENTION

One object of the present invention is to provide a scanning probe microscope which is capable of obtaining a first three dimensional image (STS image) based on information about the local charge density of states in the surface of a sample and a second three-dimensional image (STP image) based on information about the local potential distribution of the sample as well as a third three dimensional image (AFM image) based on the interatomic force in the sample surface.

Another other object of the present invention is to provide a scanning probe microscope which may obtain a local physical information of a sample surface by stimulating it with energy such as an electrical current, an electrical voltage, light, heat and a magnetic field, while a servo control is accomplished to keep the distance between the sample and probe constant.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is an explanatory view for illustrating a first embodiment of the present invention;

FIG. 2 is an explanatory view for illustrating a second embodiment of the present invention;

FIG. 3 is a perspective view of a cantilever used in the second embodiment;

FIG. 4 is an explanatory view for illustrating a third embodiment of the present invention;

FIGS. 5A and 5B are views showing the variation in a force acting on a probe with respect to the position of a sample and the variation in current flows with respect to the position of the sample, respectively;

FIG. 17 is a cross sectional view of a further embodiment of the invention, which is used for observing an optical image of the surface of a sample;

FIG. 18 is a cross sectional view of a further embodiment of the invention, which is used for detecting light emitted from the surface of the sample.

DETAILED DESCRIPTION OF THE PREFERRED EMBODIMENTS

Figure 6:
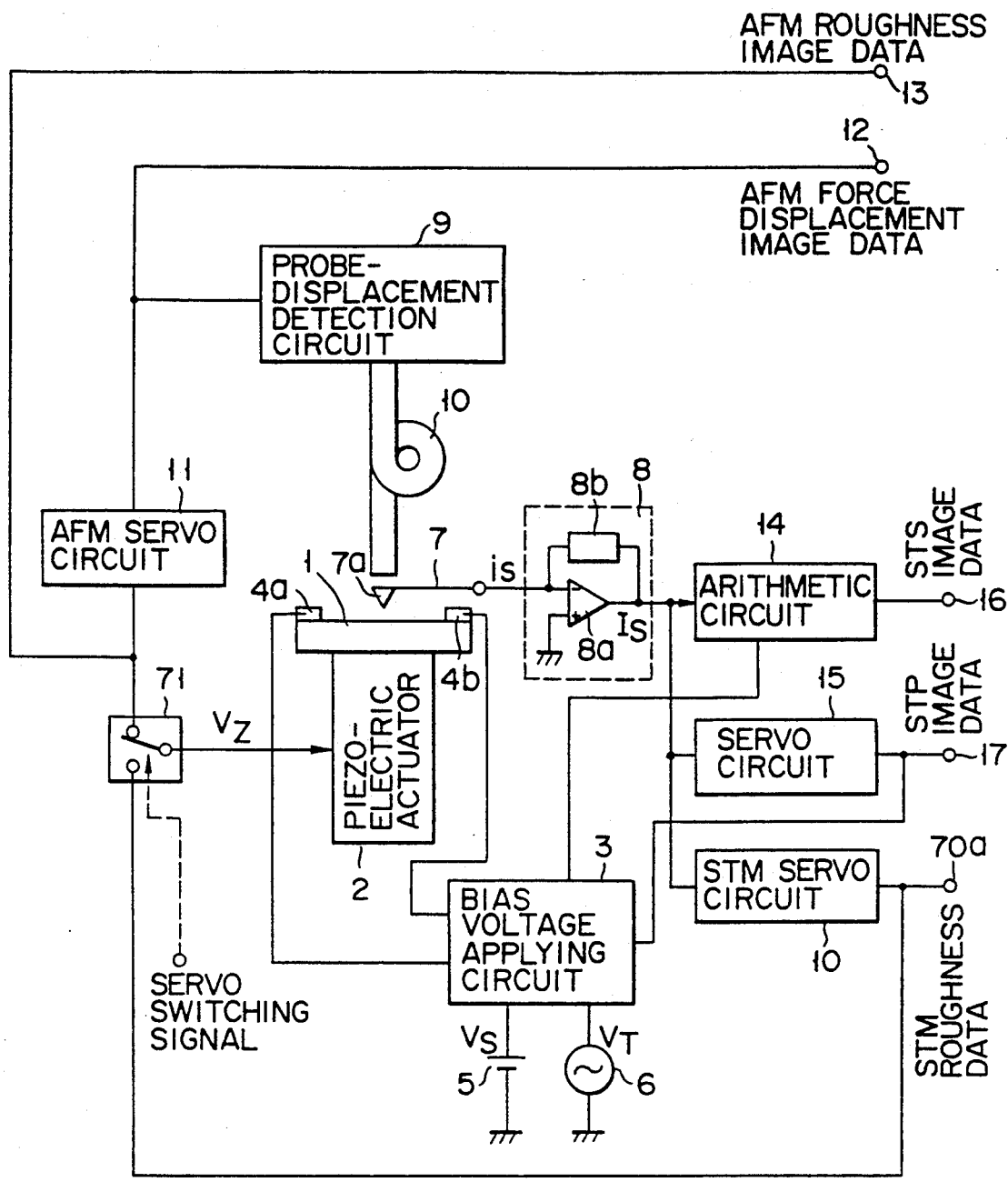
FIG. 6 is a circuit diagram for explanation of a fourth embodiment of the present invention.

FIG. 1 is a view showing a first embodiment of the present invention. As illustrated, a sample 1 is positioned on a piezoelectric actuator 2 which is fine-movable in three dimensional directions within a determined range. The sample 1 has electrodes 4a, 4b provided at the opposite ends thereof for applying a voltage fed from a bias voltage applying circuit 3. The bias voltage applying circuit 3 is connected with a potential gradient voltage generator 5 for supplying a potential difference $V_S$ to the portion of the sample 1 located between the electrodes 4a, 4b and a modulated voltage generator 6 for supplying to the sample 1 a modulated voltage $V_T$ having a determined cycle and amplitude and varying with the passage of time. A conductive cantilever 7 is provided extending substantially horizontally above the sample 1 so that a probe 7a provided on a free end of the cantilever 7 at the lower side will come close to the surface of the sample 1. The cantilever 7 is made of a selected material in a selected form so as to be furnished with a determined spring constant and is electrically connected to a tunnel current detection circuit 8 for detecting a tunnel current I which will occur between the probe 7a and the sample 1 when the probe 7a is moved close to the sample 1. There is provided a light interference fiber 10 above the cantilever 7 with its free end positioned in opposition to the lower end of the light interference fiber 10 which is connected to a probe displacement detection circuit 9 for detecting displacement in a vertical direction of the cantilever 7. The probe displacement detection circuit 9 is connected to an AFM servo circuit 11 and an AFM force displacement image data output terminal 12, the AFM servo circuit 11 being operative to control the position of the sample 1 via the piezoelectric actuator 2 with reference to the amount of displacement in the vertical direction of the probe 7a. The AFM servo circuit 11 is connected by its output to the piezoelectric actuator 2 and an AFM roughness image data output terminal 13 respectively. On the other hand, said tunnel current detection circuit 8 includes an operational amplifier 8a and a feedback resistor 8b coupled in parallel to the latter, with its output being connected to an arithmetic circuit 14 and a potential servo circuit 15. The arithmetic circuit 14 is intended to produce STS image data by finding a dependency of the detected current $I_S$ against the modulated voltage $V_T$ (for example a differential conditions $\partial I_S/\partial V_T$, $\partial \log I/\partial \log V$, or $\partial^2 I/\partial V^2$) from a tunnel current $I_S$ detected by the tunnel current detection circuit B and a modulated voltage $V_T$ delivered via the bias voltage applying circuit 3 from the modulated voltage generator 6, and which circuit 14 has an STS image output terminal 16 at its output side. Said potential servo circuit 15 is intended to produce STS image data by finding a voltage $V_R$ for shifting a potential applied to the entire sample 1 by the integration of a tunnel current $I_S$ detected by the tunnel current detection circuit 8. The circuit 15 has an STP image data output terminal 17 at its output side.

Now, the description will be made of the operation of this embodiment. The operation of the device is the same as the device of the aforementioned prior application by the same applicants except that in the STS and STP operations, the probe servo is accomplished by the AFM servo circuit 11. Thus, a detailed explanation will be omitted.

First, the original point ZO of displacement of the cantilever 7 is obtained. The original point $Z_O$ of displacement is placed at the back side of the cantilever 7 while the sample 1 is positioned away from the probe 7a. The original point $Z_0$ can be detected by the light interference fiber 10 and probe displacement detection circuit 9.

The piezoelectric actuator 2 is used to gain the force $F=k \times Z_C$ exerted on the probe 7a through the amount of displacement $Z_C$ of the cantilever 7 in the Z-direction from the original point $Z_O$ of displacement at the time when the sample 1 is moved near the probe 7. The amount of displacement of the cantilever 7 to be fed back is identified as $Z_S$ in order to keep constant the force F acting between the sample 1 and probe 7a. With reference to the amount of displacement detected by the probe displacement detection circuit 9, the AFM servo circuit 11 impresses a servo voltage $V_Z$ on the piezoelectric actuator 2 and controls for feedback so that the amount of displacement of the cantilever 7 (probe 7a) is equal to $Z_S$. The scanning of the sample 1 in X and Y-directions is achieved by impressing a scanning voltage on the X- and Y-direction members of the piezoelectric actuator 2 so as to record an AFM servo voltage signal $V_Z$ in synchronization with this scanning voltage, thereby obtaining AFM roughness image data under the constant force, with the result that the data is outputted from the output terminal 13 to display the AFM roughness image on a display means (not shown). Also, by recording data of the amount of displacement from the probe displacement detection circuit 9 in synchronization with the scanning voltage, there can be obtained AFM force displacement image data representing the variation in intensity of a force acting between the sample 1 and probe 7a via the terminal 12.

During the scanning by the probe 7a, a tunnel current $I_S$ flows between the sample 1 and probe 7a. A voltage $V_R$ for shifting the potential of the overall sample may be obtained by detecting the tunnel current $I_S$ and integrating it by means of the potential servo circuit 15. At this time the potential servo operation is carried out for changing the shifting voltage $V_R$ so that said tunnel current $I_S$ becomes zero. The recording of this shifting voltage $V_R$ in synchronization with the XY scanning voltage allows the measurement of $S_T$ image data in accordance with the potential distribution on the surface of the sample 1, and the resultant data is supplied from the output terminal 17 to a second display means (not shown) in which the STP image is displayed.

Furthermore, since the tunnel current $I_S$ varies as the modulated voltage $V_T$ varies with the passage of time, this can be applied for obtainment of information concerning a local dependency of voltage. Thus, the tunnel voltage $I_S$ and modulated voltage $V_T$ are fed to the arithmetic circuit 14 to obtain, for example, a differential conductance ($\partial I_S / \partial V_T$), and a sampling in synchronization with the modulated voltage $V_T$ is effected to obtain STS image data in response to the local density state of electric charge in the surface of the sample 1, and the STS data is outputted from the terminal 16 to a third display means (not shown) in which the STS image is displayed.

In the above-described manner, the present embodiment enables obtainment of AFM, STP and STS images on the surface of the sample based on three different items of information such as the interatomic force acting between the sample and probe, the local potential distribution in the surface of the sample and the local density state of electric charge. Also, a three-dimensional image data of the intensity distribution of the current $I_S$ may be obtained. Furthermore, I-V characteristics of the local point may be recorded or reproduced by recording the current $I_S$ in synchronization with the bias voltage $V_T$.

Next, a second embodiment of the present invention will be described with reference to FIGS. 2 and 3. The like symbols will be applied to the like members as in FIG. 1 and detailed description thereof will be omitted.

The second embodiment is different from the first embodiment in the STM arrangement in that means for detecting the amount of displacement of the cantilever 7 (probe 7a) is utilized for the detection of displacement of the tunnel current flow.

In this embodiment, as illustrated by FIG. 3, the cantilever 7 includes the probe 7a provided on the lower side of the free end of a plate like electrical insulating lever 7b, a conductive film 7c positioned on the face (top surface) of the lever 7b opposite to the probe 7a, and a conductor wire or strip 7d positioned on the lower side of the lever 7b and electrically connecting the probe 7a to the tunnel current detection circuit 8. Said conductive film 7c is grounded, and the conductive film 7c and the probe 7a are electrically insulated from each other by the insulator 7b. As shown by FIG. 2, a probe displacement detection probe or a tunnel chip 20 is arranged such that the lower end of the tip will come near the conductive film 7c of the cantilever 7. This particular displacement detection probe 20 is connected with a current detector 21 for detecting a tunnel current $I_F$ which will flow between the probe 20 and conductive film 7c when a bias voltage $V_F$ is applied to the probe 20. The probe 20 is supported at its posterior end by the piezoelectric actuator 2 intended to drive the probe 20 in a Z-direction. The piezoelectric actuator 22 is connected to a controller 23 for controlling the Z-directional displacement of the probe 20. Said current detector 21 includes two operational amplifiers 21a, 21b, a bias voltage source 21c, and a feedback resistor 21d, with its output side being connected with an output terminal 25 through the FM servo circuit 11, $I_F$ signal output terminal 12, and a logarithm arithmetic unit 24.

The drive signal is applied to the actuator 22 by the controller 23, so that displacement detection probe 20 is now placed at a distance $G_F$ from the conductive film 7c short enough to allow the passage of a tunnel current $I_F$. At this time, the interatomic force acts between the sample 1 and probe 7a so as to deflect the cantilever 7, thereby resulting in change of the tunnel current $I_F$.

The AFM servo circuit 11 serves to control the Z-directional position of the sample 1 by the use of the piezoelectric actuator 2 so that the tunnel current $I_F$ flowing between the probe 20 held in position and the posterior aspect of the cantilever 7 (conductive film 7c) becomes constant, namely the amount of deflection of the cantilever 7 becomes constant at a determined level. Then, the force acting between the sample 1 and probe 7a becomes constant.

If the servo output signals $V_Z$ are put out of the terminal 13 of the AFM servo circuit 11 and recorded concurrently with the XY scanning operation, an AFM image date showing the roughness of the sample surface may be obtained subject to the force being kept constant.

On the other hand, in case the AFM servo circuit 11 has a time constant which is more slow than the cycle of variation in roughness of the surface of the sample 1 in accordance with the X scanning, the servo signals $V_Z$ from the AFM servo circuit 11 cannot follow close in the roughness variation, and thus the displacement of the cantilever 7 is incidental to the tunnel current $I_F$. In this connection, if the variation of $I_F$ is recorded concurrently with the XY scanning AFM force, displacement image data can be obtained, indicative of varying intensity of a force acting between the sample and the force detection probe.

Since the tunnel current $I_F$ depends on a distance $G_F$ between the displacement detection probe 20 and conductive film 7c and varies exponentially as is represented by the expression: $I_F = \exp(-A\phi^{\frac{1}{2}}G_F)$, $\log(I_F)$ may be found using the logarithm arithmetic unit 24 to obtain a signal proportional to the displacement of the cantilever from the output terminal 25.

If this signal is recorded during the XY scanning, the varying amount of a roughness which is finer than the space frequency of roughness of the sample followed by the servocontrol can be detected by a distance order and formed into an image.

The description of other operations will be omitted as they are the same as for the first embodiment.

In this embodiment, there can be obtained AFM images, STP images and STS images in the surface of the sample based on information of the interatomic force acting between the sample and probe, local distribution of electron in the surface of the sample and the local state of electrons. Also, in this embodiment, the principle of the STM is utilized instead of using of an optical fiber, for detecting the displacement of the cantilever. Thus, this device may be effectively used with such a sample wherein leakage light from the optical fiber may influence the aforementioned information.

Instead of using a principle of an STM for detection, a displacement detection method utilizing a resonance frequency of a cantilever or a displacement detecting method utilizing a variation of a capacity between a cantilever and an opposite electrode facing the cantilever may be utilized to obtain the same advantage.

Next, a third embodiment of the present invention will be described with reference to FIG. 4. The like symbols will be applied to the same members as those in FIG. 1, and a detailed description thereof will be omitted.

The third embodiment is different from the second embodiment in that a digital control means 30 replaces with the arithmetic circuit 14 and servo circuit 15 so that a bias voltage in a digital form may be applied to the sample, so that the bias voltage is digitally controlled by the digital control means 30 so as to be impressed on the sample 1, and so that the measurement of STS image data and STP image data may be performed by digital computation rather than by using any specific circuits. This particular control means 30 is connected at its input to the output of the tunnel current circuit 8 and at its output to the terminals 16, 17 and the input of the bias voltage applying circuit 3 in order to obtain the modulated voltage $V_T$ and potential difference $V_S$. Other things are much the same as with the first and second embodiments.

The present embodiment also may obtain, as in the first and second embodiments, AFM images, STP images, and STS images in the surface of the sample based on information on the interatomic force acting between the sample and probe, the local distribution of electrons in the surface of the sample, and the local state density of electric charge. In accordance with the instant embodiment, this digital control system makes it possible to provide stable control of the bias voltage. Additionally, without use of the particular circuits such as the potential servo circuit, differential conductance arithmetic circuit, etc., measurements of STS and STP image data by digital processings, correction by a tunnel resistance value, and various arithmetic processes can be performed.

The present invention is not limited to said embodiments, but other variations and modifications may be made. For example, with any of said previous embodiments, 3 three dimensional data of AFM, STP and STS images can be obtained when the probe is scanned in the XY-directions over the surface of the sample. And besides, additional data showing the variation of a force (e.g. interatomic force) acting on the probe relative to the sample position as shown in FIG. 5A and further data showing the variation of a current flow with respect to the sample position as shown in FIG. 5B can be obtained simultaneously.

Figure 7:
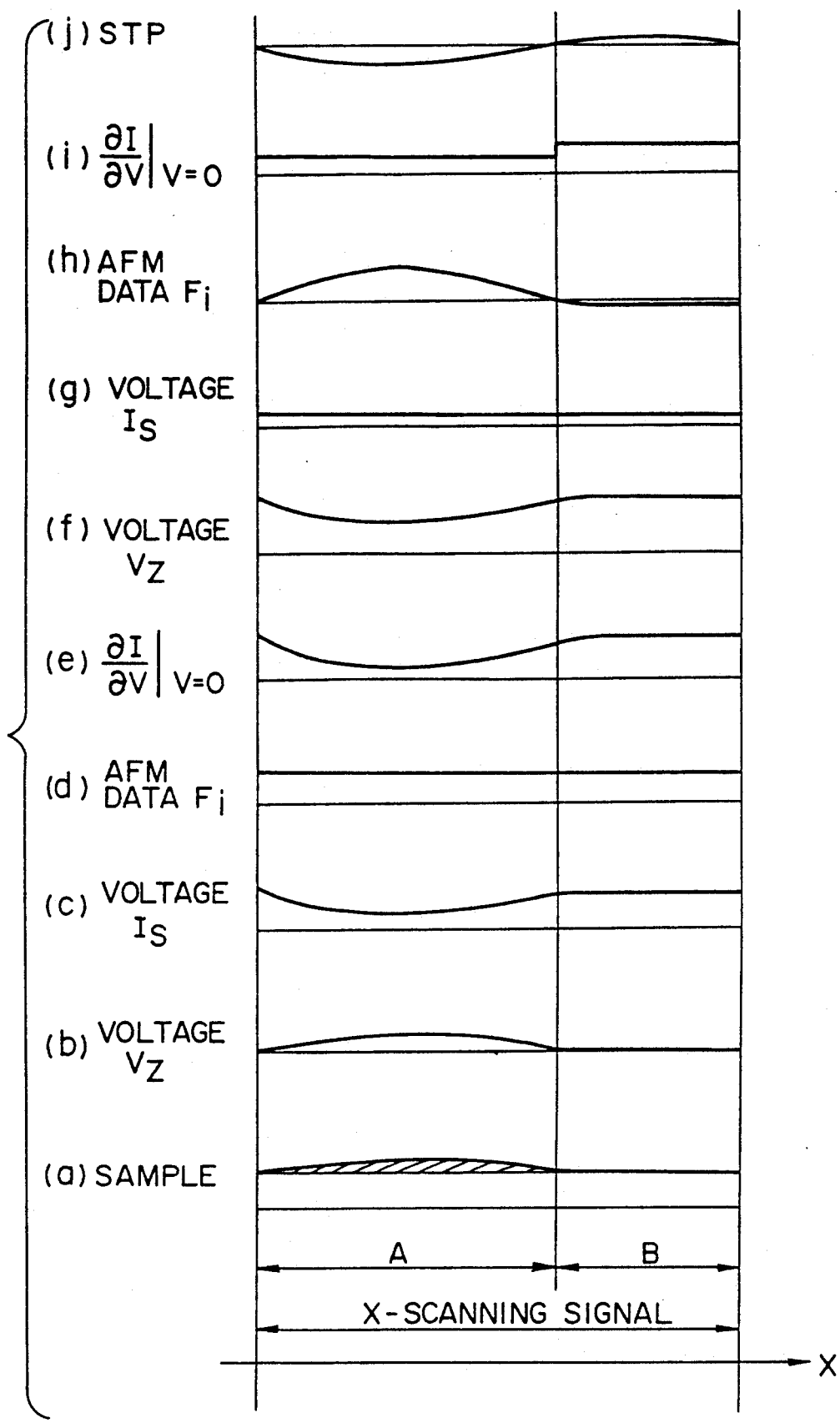
FIG. 7 is a timing chart for the respective signals of the fourth embodiment.

FIG. 6 shows the structure of a fourth embodiment of the instant invention and FIG. 7 is a corresponding view showing the cross section of the sample to be measured and signal to be obtained. The like symbols are applied to the same members as those in FIG. 1, and detailed description will be omitted.

The fourth embodiment is different from said first embodiment in that, as shown by FIG. 6, the addition of an STM servo circuit 70 and a servo signal switching unit 71 connected to each other in the following manner permits the switching of a control circuit at a distance between the sample 1 and probe 7 from the AFM servo circuit 11 and STM servo circuit 70.

Referring to the STM servo operations and STS operation using the additional STM servo circuit 70 arranged in FIG. 6, and the STM operation, a probe for detecting the tunnel current corresponds to the cantilever 7, and the light interference fiber 10 for detecting the displacement of the cantilever 7 and the probe displacement detection circuit 9 are additionally provided. Other matters than the above-described are same as disclosed in the prior application filed by the present applicant of which the Background portion has described. So, no detailed explanation will be made.

FIG. 7 illustrates the interrelation between a series of data obtained by the present embodiment and the cross section of the sample in the X- direction.

Signal FIG. (a) in FIG. 7 shows a cross section of the X direction of the sample within the measured range. A base plate is of metal, the area drawn by slant lines within a region A is oil-smeared areas, and region B is a relatively clean metallic surface.

Signals (b) to (e) in FIG. 7 show each of signals subjecting AFM to servo-control, and signal (f) to (i) show each of signals subjecting STM to servo-control. Signal 7(j) in FIG. 7 shows STP information which is not influenced by the servo switching.

When the AFM is servo controlled, the servo switching unit 71 as shown in FIG. 6 stands for the AFM side, and the output voltage of the AFM servo circuit 11 is applied as $V_Z$ to the Z-direction member of the piezoelectric actuator 2. The servo-control of AFM involves maintaining constant a repulsive force acting between the probe 7 and sample 1 so that the piezoelectric actuator tends to shrink more in the Z-direction as the voltage $V_Z$ is more increased. Then, the voltage $V_Z$ shows a roughness corresponding to the roughness on the surface of the sample as illustrated in FIG. 7 (b). The AFM force displacement image data $F_L$ is an output from the probe displacement detection circuit 9, which shows the amount of deflection of the cantilever-beam-structured probe 7. In this instance, the position where no force is applied is identified as zero, and the direction in which the repulsive force is applied is identified as a positive direction. During the servocontrol in the AFM, there is some repulsive force in action with $F_L$ having positive value preset by the AFM servo circuit as shown in FIG. 7 (d). The current strength $I_S$ is a strength of a current flowing between the metallic portion of the sample base plate and the top end of the probe 7. While a substantially constant rate of contact current flow passes in the region B, the interval between the electrodes is extended wider by the smeariness of the slant lined portion in the region A, with the result that it is difficult for the current to flow with its current value $I_S$ being smaller than that in the region B.

During the servocontrol in the STM, the servo switching unit 71 shown in FIG. 6 stands for the STM side, and the STM servo circuit 70 applies a voltage $V_Z$ to the Z-direction element of the piezoelectric actuator 2. The STM servo circuit is adapted to render constant the strength of $I_S$ which is the output of tunnel current detection means 8.

In this case, it is necessary to have more reduced voltage $V_Z$ in the region A than in the region B in order to extend the piezoelectric actuator 2. The probe 7 will be elevated by the force from the surface of the sample. That is, the voltage $V_Z$ behaves to look as if the region A is incurved as in FIG. 7, and draws a plane with fidelity to the roughness of the metallic surface in the region B. On the other hand, as shown in FIG. 7 (h), the output $F_L$ of the probe displacement detection circuit 9 reaches the range of the repulsive force in the region A, and is attracted to the surface in the relatively clean region B within the area of attractive force. The current strength $I_S$ becomes equal to a certain value preset by the STM servo circuit as shown in FIG. 7 (g).

As regards the signal of the STS image data (the one when the bias voltage is zero $[\partial I_T/\partial V_T|_{VT=0}]$) outputted from the differential conductance arithmetic circuit, FIG. 7 (e) shows said signal during the servocontrol of AFM, and FIG. 7 (i) shows said signal during the servocontrol of STM.

The differential conductance suggests that the current flows easily, and is also proportional to the strength of tunnel current.

During the servocontrol with the AFM, the differential conductance tends to have a value substantially corresponding to the contact resistance at the metallic portion of the region B, but at the region A, since each place has a different interval between the metallic portion and the probe, a low value is yielded at a considerably smeared place as shown in FIG. 7 (e).

On the other hand, during the servocontrol in the STM, as shown in FIG. 7 (i), the metallic portion of the sample base plate is at a far distance from the leading end of the probe, and at the metallic portion of the region B, the differential conductance is small as compared with the counterpart during the servocontrol of AFM. Also, because the current is kept constant in strength in the region A unlike in the servocontrol of AFM, a given value of the differential conductance is yielded. In the region A, however, the presence of stains between the probe and the metallic portion renders the current and voltage semiconductive in quality, and thus, the value of the differential conductance when the bias voltage is equal to zero is smaller than that in the region B which shows the metallic characteristics.

If a potential gradient is established in the X-direction and the measurement by STM is effected at the same time, the potential difference will be reduced substantially to zero by way of the conducting of the metals at right and left hands in the region A, and there is such a potential distribution as shown in FIG. 7 (j) where a potential drop due to the potential concentration in the region A is observed. This provides the same information irrespective of the condition of servocontrol.

As above-described, even if measurement is carried out in the same region, different information will result respectively in case of the AFM servo circuit used and in case of the STM servo circuit used, but in both cases, useful information will be provided by the measurement of the surface conditions of very small areas. However, with the measured area being less than if the measurement is effected by the STM servomechanism after a measurement by the AFM servo, it cannot be determined that the same area has been measured. In this regard, in order to obtain said information with reference to one very small area simultaneously, it maybe conceived that a measurement process comprises impressing an electric signal to a switching signal from the servo switching unit, and alternating measurements by AFM and STM servomechanisms one with another in scanning each line.

Figure 8:
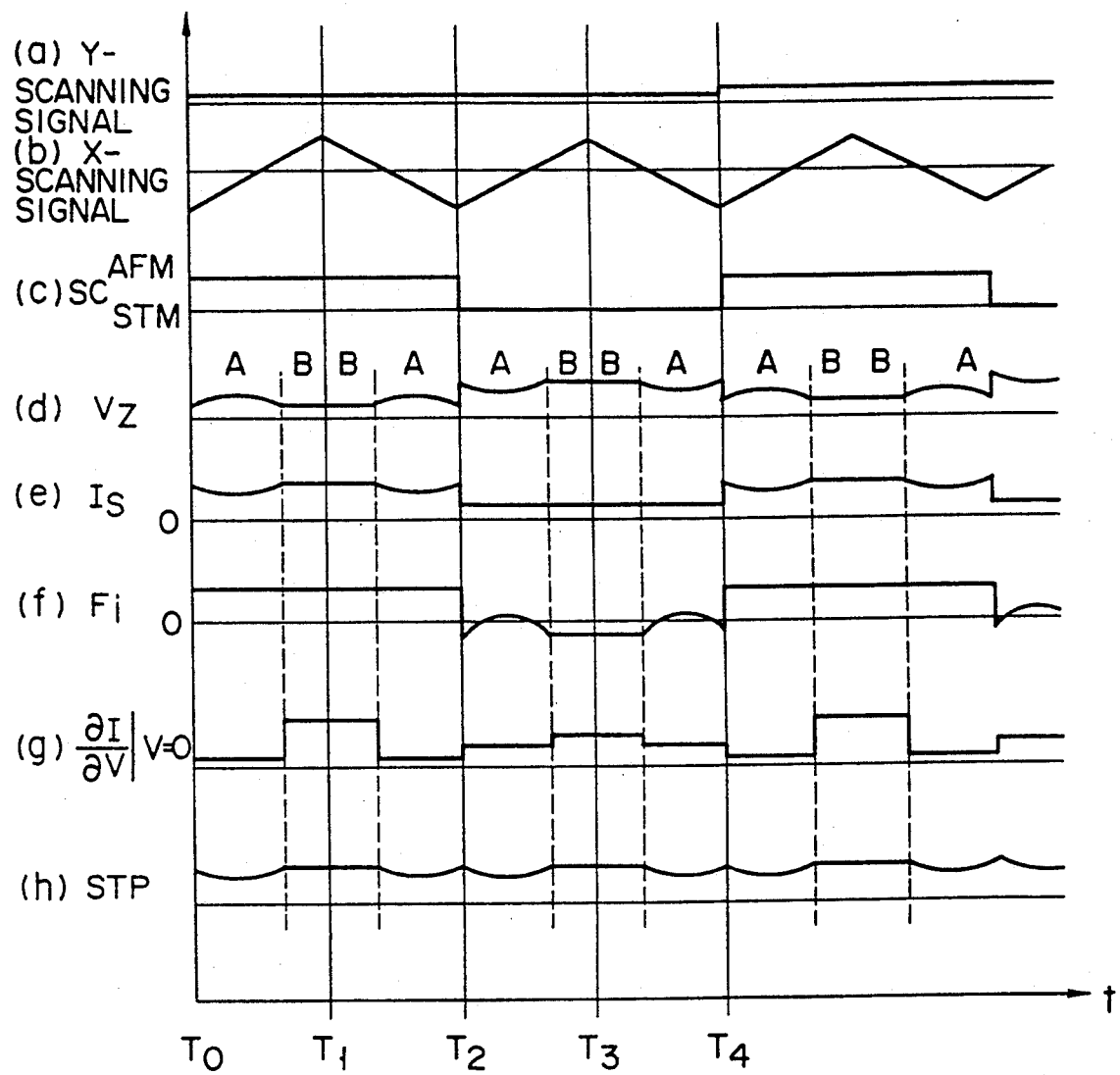
FIG. 8 is a view showing measurement signals according to the passage of time.
Figure 9:
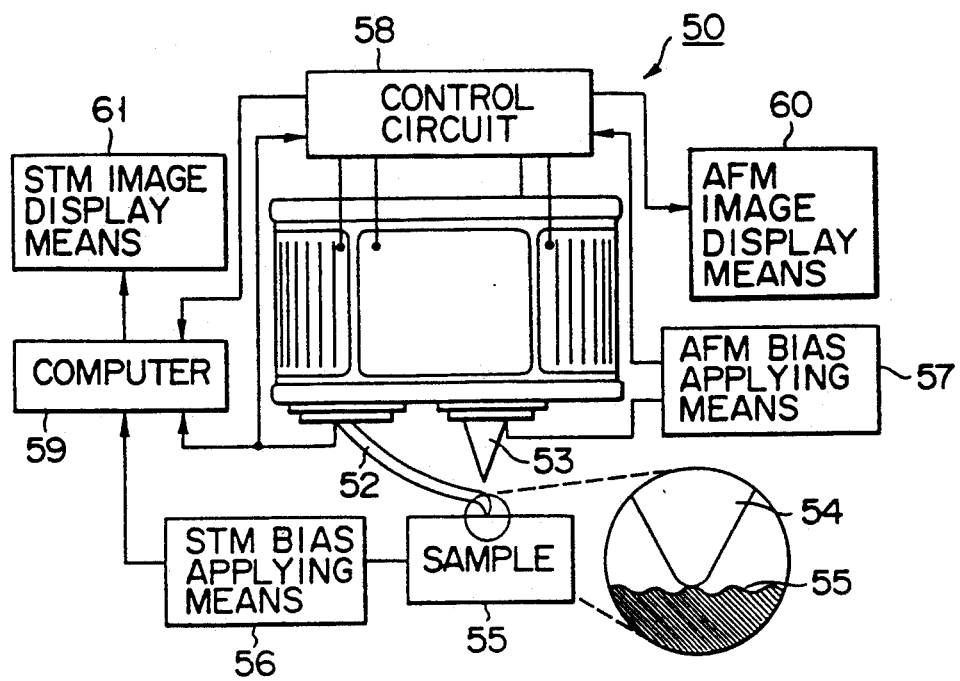
FIGS. 9 and 10 are a circuit diagram and line view for explanation of a prior art technique.
Figure 10:
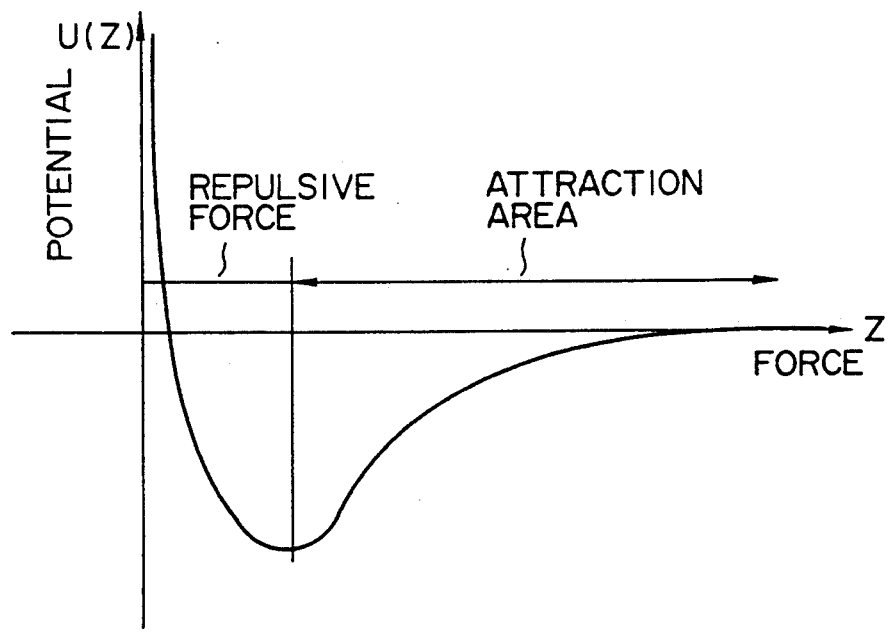

FIG. 8 shows the sequence of such a measurement with the horizontal axis representing a time axis.

FIG. 8 (a) and (b) show Y scan signal and X scan signal produced by a voltage generator which is not shown in FIG. 6. X scan signal is a triangle waveform which repeats waveforms between $T_O$ and $T_Z$, and Y scan signal is increased by one step value at a point of $T_4$ in which the X scan signal has run 2 cycles. That is, each line is scanned twice. The servo switching until 71 here is set to stand for the AFM side at a high level and for the STM side at a low level. In order to execute measurement by switching from the AFM servocontrol to the STM servocontrol per one X scan, as shown in FIG. 8 (c), a servo switching signal SC is brought to a high level in the position between $T_O$ and and $T_2$, thereby resulting in the AFM servocontrol mode, and the servo switching signal SC is brought to a low level in the position between $T_2$ and $T_4$, thereby resulting in the STM servocontrol mode. By repeating the above-described operations between TO and T4 at each step of the Y scan signal, the measurements by the AFM and STM servocontrols may be made at the same time for the same area.

With respect to the preservation of data, in consideration of the influence of the switching of servocontrol, the respective data (FIGS. 8 (d) to (h)) corresponding to those of FIGS. 7 (b) to (e) at 128 points between $T_1$ and $T_2$ are sampled, and the values of X and Y scan signals are held or displayed as coordinates in the data region at the AFM servocontrol in a data memory or data display unit not shown in FIG. 6. And then, the measurement data (FIGS. 7 (d) to (h)) corresponding to those in FIGS. 7 (f) to (j) at 128 points between $T_3$ and $T_4$ are sampled, and held or displayed in the data region at the STM servocontrol. Said operations are repeatedly performed at the respective steps of Y scan signals in the same manner as in the servo switching so as to hold or display the information within the entire two-dimensional scan region. In FIG. 8 (d) A and B regions are indicated as symbols A and B. The B region corresponds to that shown in FIG. 7. Both regions are scanned, and FIG. 8 (d) also shows various waveforms of signals which have been impressed on the piezoelectric actuator and which are correspond to the respective modes and scan points. FIG. 8 (e) shows output amplitudes $I_S$ of the current detector 8 at the respective points of time, and FIG. 8 (f) shows AFM force displacement image data $F_L$ outputted from the probe displacement detection circuit 9. FIG. 8 (g) shows waveforms of STS image data $(\partial I/\partial V \vert_{V_T=0})$ outputted by the differential conductance arithmetic circuit 14 which has sampled the differential conductance when the bias voltage $V_T$ is 0 V. FIG. 8 (h) shows waveforms of STP image data outputted from the potential servo circuit 15. The respective waveforms are such that they correspond to the cross sections during the STM and AFM servocontrol.

In accordance with the instant embodiment, the AFM, STS, STP measurement by the STM servocontrol and the AFM, STS, STP measurement by the AFM servocontrol can be done simultaneously with respect to the same region.

Furthermore, the arrangement as shown in FIG. 6 allows the simultaneous measurement not only by switching the servocontrol for each line as in this embodiment but also by performing the servo switching at each scanning.

As described above, in accordance with the present invention, there can be provided a scanning probe microscope wherein a 3-dimensional image (STS image) based on information relative to the local charge density state of the surface of a sample and a three-dimensional image (STP image) based on information relative to the local distribution of potential can be obtained, and a three dimensional image (AFM image) based on the atomic force on the surface of the sample can also be obtained simultaneously.

Hitherto, a conventional an STM device has been used to determine the bias-dependency of the tunnel current flowing between a sample and the probe of an STM. From the bias-dependency of the tunnel current, we can obtain data representing the electron condition and vibration condition of the sample. The electron condition corresponds to the electron density and the primary differential spectrum of the tunnel current. The vibration condition corresponds to the secondary differential spectrum and the photon spectrum.

In the conventional STM device, a constant bias voltage is applied to the sample, thus generating a tunnel current flowing between the probe and the sample. The STM probe is moved in the Z direction, while scanning the X-Y plane, such that the tunnel current remains constant.

When the STM probe reaches a sampling point where the bias-dependency of the tunnel current is to be measured, the X- and Y-direction motion of the probe is stopped, thus terminating the scanning of the X-Y plane. The Z-direction mode is then stopped, thereby fixing the probe at the sampling point. In this condition the bias voltage is swept, whereby the bias-dependency of the tunnel current is measured.

The reason why the Z-direction motion of the STM probe is stopped will be described. Where the probe is moved in the Z direction in accordance with the tunnel current, its position should change as the bias voltage applied to the sample is swept, since the tunnel current varies with the bias voltage. Consequently, it would be no longer possible to measure the biasdependency. Therefore, it is necessary to hold the probe at a fixed position throughout the measuring of the bias-dependency of the tunnel current.

With the conventional STM device, wherein the probe is moved in the Z direction in accordance with the tunnel current, it is necessary to stop the control of the position of the probe in order to measure the bias-dependency of the tunnel current. Here arises a problem. While the position of the probe is not controlled, it is extremely difficult to locate the probe at the same distance from the sample, because of the vibration externally applied to the STM device and/or the temperature drift of the mechanical system of the STM device. The inevitable changes in the distance between the probe and the sample, if caused by the vibration, often results in changes in the tunnel current. Consequently, it is difficult to measure the bias-dependency of the tunnel current with high accuracy.

Before description is made of other embodiments of the invention, i.e., AFM-STMs, the principle of the invention will be explained.

The physical quantity, which is to be detected at a specified position on the surface of the sample, varies due to any stimulus externally applied to the sample. Hence, the physical quantity can be detected quantitatively from the influence the stimulus imposes on the sample.

The external stimulus is, for example, a bias voltage, a light beam, a magnetic field, a potential change, heat, an electrochemical modulation, a chemical modification, a biochemical modification, or a local interaction.

a) A bias voltage is applied, as a stimulus, to the sample. This voltage is modulated, thereby recording how the tunnel current depends on the bias voltage. Based on the dependency of the current on the bias voltage, the primary and secondary differential spectra of the tunnel current are determined. The electron density is detected from the primary differential spectrum, and the band gap is determined from the electron density. Further, the vibration condition (non-elastic scattering) is detected from the primary differential spectrum, and the phonon spectrum is obtained from the vibration condition. Finally, the electric switching attenuation in a limited portion of the sample is determined.

b) A light beam is applied, as a stimulus, to the sample, whereby the tunnel current is generated from the light beam, and the photoconductivity and the electron density of the sample change. The tunnel current is measured, thereby determining both the photoconductivity and the electron density.

c) A magnetic field is applied, as a stimulus, to the sample, whereby the tunnel current flowing between the probe and the sample changes, and the intensity of light emitted from the sample changes. From the changes in the tunnel current, the vertical relaxation and horizontal relaxation of the spin (i.e.. electron spin or nucleus spin) are detected. From the changes in the light intensity, the hysteresis curve (a combination of an MFM and a STM) for a specified portion of the sample is obtained.

d) A potential of the sample is changed, thus stimulating the sample. The STP is measured, thereby determining the effect the magnetic field imposes on the emission of light from the sample.

e) Heat is applied, as a stimulus, to the sample, whereby a tunnel current is generated and flows between the probe and the sample. From this current, the surface-temperature distribution of the sample, the heat history defined by the local magnetic field, the local thermal deforming of the sample, and the like are determined by means of an AFM heat profiler.

f) An electrochemical modulation is applied, as a stimulus, to the sample, electrically corroding the sample. The degree of the electric corrosion is evaluated, thereby determining the ion current flowing through the sample.

g) A chemical modification is applied to the sample, causing a catalytic reaction in the sample. The degree of this reaction is measured.

h) In the case where a biochemical modification (e.g., an immunological one) is applied to the sample, the distribution of the anti-immunoglobulin in the sample changes. This change in the anti-immunoglobulin is detected by applying an anti-immunoglobulin antibody modified by metal colloid. Instead of a antiimmunoglobulin antibody modified by a radioisotope, which is used in radioimmunoassay.

i) A local interaction (e.g., dipole-dipole interaction, charged-transfer (CT) interaction, or Van der Waals interaction) is performed in the sample. If the magnetic dipole located at the tip of the probe and the magnetic dipole mounted on the sample interaction the relationship between the magnitude of the interaction and the tunnel current flowing between the probe and the sample is determined. If the molecules located at the tip of the probe and the those mounted on the sample interact, the relationship between the magnitude of the CT interaction and the tunnel current is determined.

The physical quantity, which is to be detected at a specified position on the surface of the sample, also varies as the sample is moved. In other words, the quantity changes in accordance with the position of the sample. The sample is moved from one position to another, while no stimuli are externally applied to the it, thus changing the physical quantity. The changes in the physical quantity are measured.

Figure 11:
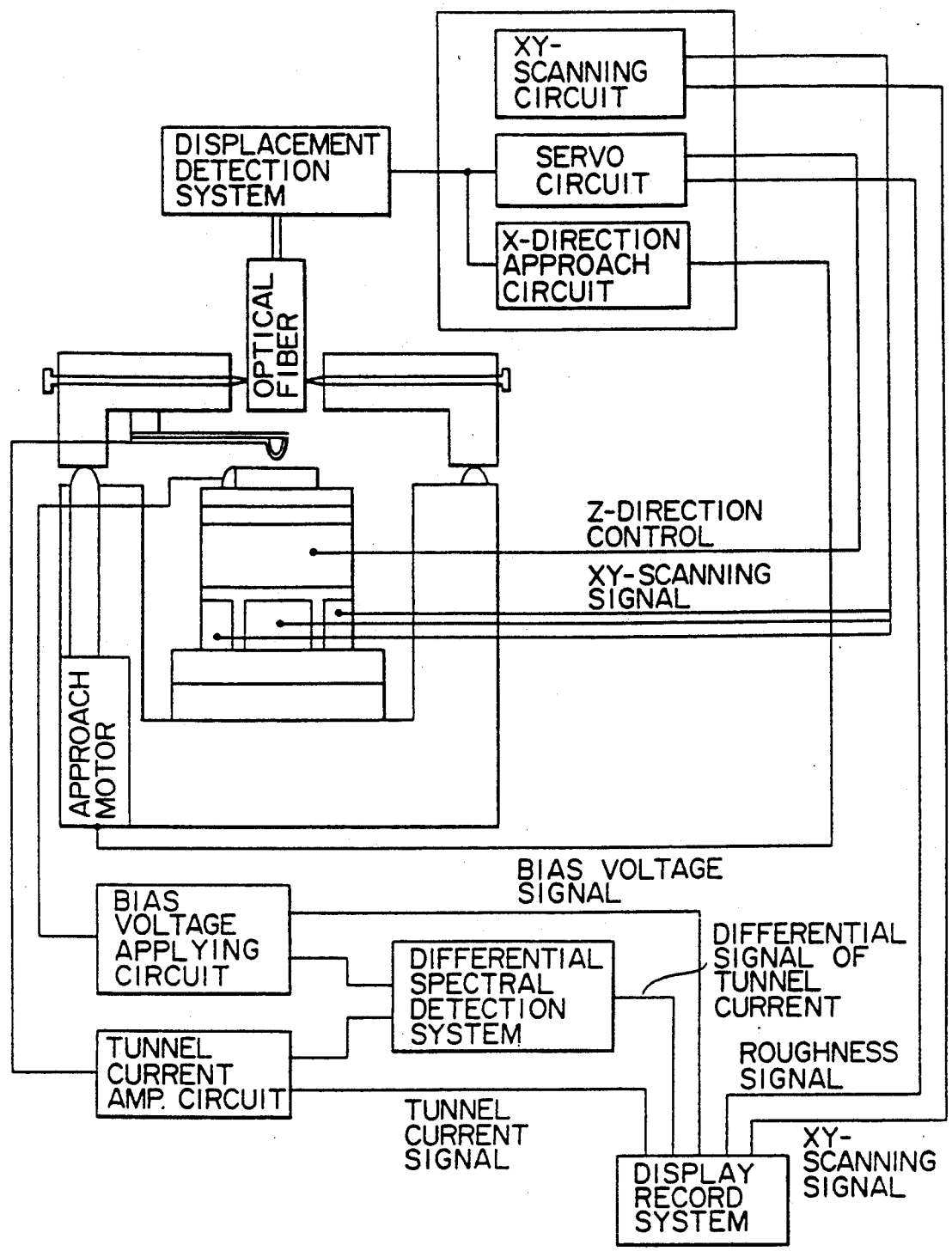
FIG. 11 is a view for illustrating other embodiments.

AFM-STM's, according to the other embodiments of the invention, which are incorporated in an AFM system, will now be described. As is shown in FIG. 11, the AFM system comprises a sample stage unit, a displacement detection system, a control system, and the AFM-STM of the invention.

The sample stage unit includes a piezoelectric actuator, a sample table, and a coarse drive mechanism. The piezoelectric actuator has a piezoelectric element for moving a sample in the Z direction minutely while the probe is being moved in the X-Y plane. The sample table is designed to hold the sample attached to the actuator. The table can be made of metal. If so, the sample is attached to the fine actuator by means of an insulator. The coarse drive mechanism is designed to move the sample coarsely in the Z direction toward the probe. This mechanism can have an XY stage for moving the sample table and, hence, the sample, in the XY plane.

The displacement detection system has a cantilever, a sensor unit, and a three-dimensional position controller. The cantilever is made of electrically conductive material and has a predetermined spring constant. It opposes the sample mounted on the sample table. The probe protrudes downwards from the free end of the cantilever, and is located very close to the sample in order to detect the inter-atomic force (van der Waals force) exerted between the probe and the sample. The sensor unit located above the free end of the cantilever, has an optical fiber, and is designed to detect the displacement of the cantilever. The optical fiber can be replaced by an interferometer. (The upper surface of the free end of the cantilever must be mirror-polished.) The three-dimensional position controller is designed to move the sensor unit in the X, Y and Z directions, thereby to place the focal point of the sensor unit at the free end. The displacement detection system is removably held on the sample table, at three points, by means of elastic members.

The control system comprises a first drive circuit, a servo circuit, a signal generating circuit, and a second drive circuit. The first drive circuit is used for driving the piezoelectric actuator in the XY plane. The servo circuit is designed to move the piezoelectric actuator in the Z direction in accordance with the displacement of the cantilever which the sensor unit has detected. The signal generating circuit is adapted to generate drive signals. The second drive circuit is designed to drive the coarse drive mechanism in accordance with the signals output by the signal generating circuit, thereby to move the sample in the X, Y and Z directions.

As is shown in FIG. 11, the AFM-STM comprises a bias-voltage applying circuit, a tunnel current detecting sections, a differential spectrum detecting section, a display/record system.

The bias voltage applying circuit has a sample electrode and a bias voltage source. The sample electrode is bonded to the sample with electrically conductive adhesive. A bias voltage is applied to the sample electrode from the bias voltage source which is able to perform voltage sweep.

The tunnel current detecting section comprises an electrode and an amplifier circuit. The electrode projects from the probe, for detecting the tunnel current flowing between the probe attached to the free end of the cantilever and the sample to which a bias voltage is applied from the bias-voltage applying circuit. More precisely, the electrode is bonded to the fixed end of the cantilever (made of a zirconium by means of silicon process) with electrically conductive adhesive. This electrode is connected to the amplifier circuit by means of a lead line. The amplifier circuit is used to convert the tunnel current supplied from the electrode into a voltage and also to amplify this voltage.

The differential spectrum detecting section has either an analog circuit or a digital circuit for a differential signal representing the tunnel current, i.e., the output of the tunnel current detecting section. This section can detect the differential spectrum of the tunnel current by one of the following three alternative methods:

Method 1

The high-frequency component of the tunnel current is superposed on the bias voltage. Then, the primary high frequency component ω (primary differential component) and secondary high frequency component 2ω (secondary differential component) are detected by means of a locked-in amplifier, thereby to obtain the data representing the electron density and the non-elastic scattering of electrons (namely, phonon spectrum).

Method 2

The so-called analog STS process is used, thereby to obtain the data representing the electron density and the non elastic scattering of electrons (i.e., phonon spectrum).

Method 3

The so-called CITS process is applied, wherein an A/D converter converts the tunnel current to digital data, and a computer processes the digital data and provides the data representing the electron density an the non-elastic scattering of electrons (i.e., phonon spectrum).

The display/record system has means for displaying and recording the bias-dependency of the tunnel current and the differential spectrum thereof.

In the AFM STM described above, the position of the sample is controlled with respect the Z direction in accordance with the inter-atomic force which is generated by the interaction between the probe and the sample and which does not depend on the bias voltage applied to the sample. As a result of this, the distance between the probe and the sample remains unchanged. Hence, the AFM-STM can measure the biasdependency of the tunnel current (or the differential spectrum) with high accuracy.

It will now be explained how the AFM-STM (FIG. 11) according to the invention operates to measure a physical quantity such as the gap of a superconductive substance, the band gap of a semiconductor body, or the phonon structure of a low-order substance.

First, the displacement detection system is removed from the sample stage unit. Next, a sample is fixed on the sample table which is mounted on the sample stage unit. The sample electrode for applying a bias voltage to the sample is bonded to the sample with adhesive which is electrically conductive.

Then, the displacement detection system is held on the sample stage, and is mechanically connected thereto by means of elastic members. At this time, the probe is spaced apart from the sample by so long a distance that the van der Waals interaction between the probe and the sample is negligibly weak.

Next, the optical sensor detects the displacement of the free end of the cantilever. A signal representing this displacement is supplied to the servo circuit. In response to the signal, the servo circuit controls the piezoelectric actuator. The sample is thereby moved in the Z direction, toward the probe, thus reducing the distance between the sample and the probe, so that any Van der Waals interaction which may occur between the probe and the sample is initiated. However, the sample is still spaced sufficiently from the probe, and no van der Waals interaction is initiated between the probe and the sample.

The sample stage is moved upwards and hence toward the probe by means of the approach motor (i.e., a stepper motor) incorporated in the coarse drive mechanism. Meanwhile, the optical sensor is monitoring the magnitude of the probe sample interaction. When the magnitude of the interaction reaches a predetermined value, or when the distance between the probe and the sample decreases to 1 nm, the approach motor is stopped, whereby the sample is no longer moved toward the probe.

Further, the bias-voltage applying circuit applies a bias voltage to the sample through the sample electrode, while the sample is being moved in the Z direction such that the inter-atomic force acting between the probe and the sample remains constant. As a result of this, a tunnel current flows from the sample to the probe. The probe detects the tunnel current. The current is supplied to the amplifier circuit and is amplified into a tunnel-current signal. This signal is input to the display/record system, which displays and records the tunnel current.

In the meantime, the bias voltage is swept, thereby detecting how the tunnel current changes with the bias voltage. In other words, the bias-dependency of the tunnel current is detected. The data representing the bias-dependency is supplied to the display/record system. The tunnel-current signal is supplied to the differential spectrum detecting section, which detects the primary and secondary differential spectra of the tunnel current.

As has been pointed out, the inter-atomic force does not depend on the bias voltage at all. Hence, the distance between the probe and the sample remains unchanged, despite the sweeping of the bias voltage applied to the sample. That is, the bias-dependency of the tunnel current can be measured, not affected by the vibration externally applied to the STM device or the temperature drift of the mechanical system of the STM device.

Next, the position of the sample is continuously controlled with respect to the Z direction, whereby the sample is held at a substantially constant distance from the probe, while the sample is moved in the X-Y plane. As a result, the AFM-STM measures the bias-dependency of the tunnel current or determines the differential spectra thereof at any point on the surface of the sample. The bias-dependency thus measured, or the differential spectra thus determined are displayed and recorded by means of the display/record system.

An AFM-STM according to a sixth embodiment of the invention for use in an AFM system of the same type as shown in FIG. 11, will now be described. The sixth embodiment is identical to the embodiment shown in FIG. 11, except that it has an additional component, i.e., a light-applying section for applying light to a sample. The light-applying section comprises a light source, a spectroscopic unit, and a light-converging unit. The light source emits light. The spectroscopic unit splits the light into beams. The light-converging unit converges one of the light beams at the surface of the sample. Owing to the use of the light-applying section, the bias-dependency and wavelength-dependency of a light-excited current can be observed.

If the inter atomic force between the probe and the sample (e.g., a sample forming a light-emitting diode) is not influenced by the light, the current flowing between the probe and the sample is detected, while controlling the position of the sample in the Z direction and thereby maintaining the inter-atomic force at a constant value. In this condition, the light source is turned on and off, successfully measuring the light-excited current with high accuracy. That is: light-excited current=(current flowing when the sample is irradiated)—(current flowing when the sample is not irradiated).

The bias-dependency of the light-excited current and the differential spectrum thereof is measured by sweeping the bias voltage applied to the sample while applying light having a specific wavelength to the sample.

The wavelength-dependency of the light-excited current is measured by sweeping the wavelength of the light applied to the sample while maintaining the bias voltage at a constant value, and then detecting how the light-excited current changes.

Still further, the distribution of the photoconductivity on the surface of the sample can be determined by X-Y scanning the sample while the position of the probe is being controlled with respect to the Z direction in accordance with the inter-atomic force acting between the probe and the sample. The photoconductivity distribution, thus determined, well serves to determine the composition distribution of the surface region of the sample.

In the sixth embodiment described above, the interatomic force acting between the probe and the sample is used to control the distance between the probe and the sample. Hence, the distance between the probe and the sample can be reliably and correctly controlled even if no light is applied to the sample and the sample is made of insulative material or has a surface region made of both insulative material and conductive material.

GaAs, for example, has a resistivity of $10^8$ $\Omega$cm and no tunnel current can flow between the probe and a sample made of GaAs. Nevertheless, a light-excited current was detected when a He—Ne laser beam having a wavelength of 0.6328 $\mu$m was applied to a GaAs sample, while applying AFM servo to the GaAs sample and moving the probe in the X-Y plane. From the light-excited current, the impurity (acceptor) concentration in the GaAs sample can be analyzed. In addition, the lifetime of the excessive carriers in the GaAs sample can be measured by applying laser beam pulses to the GaAs sample.

An AFM-STM according to a seventh embodiment of the invention for use in an AFM system of the same type as shown in FIG. 11, will now be described. The seventh embodiment is identical to the embodiment shown in FIG. 11, except that it has two additional components, i.e., a cooling unit and a heating unit. The cooling unit holds a sample at low temperatures (e.g., the temperature of liquid helium or liquid nitrogen). The heating unit applies heat pulses to the sample held at the low temperatures, thereby generating a heatexcited tunnel current which flows between the probe and the sample.

The following method is employed in order to measure the energy level and concentration of the impurity which is contained in a semiconductor sample made of silicon, and which traps electrons or holes.

At room temperature, the electrons, even if once trapped, are heat-excited in the conduction band and render the sample electrically conductive. At low temperatures, however, the trapped electrons can no longer serve to render the sample electrically conductive. In other words, a very little tunnel current flows between the probe and the silicon sample at low temperatures. In this condition, a current is supplied to the miniature heater attached to the sample, thereby applying heat pulses to that portion of the sample which contacts the heater and, hence, raising the temperature of the sample. As a result, the electrons trapped in the impurity are heat-excited, and are released from the traps.

With the AFM-STM according to the above-described seventh embodiment it is possible to detect a heat-excited tunnel current of about 10 pA by detecting the tunnel current flowing between the probe and the sample, while maintaining the probe-to-sample distance at a constant value by means of AFM servo.

An AFM heat profiler, which is an eighth fourth embodiment of the invention and designed for use in an AFM system of the same tape as shown in FIG. 11, will now be described. The AFM heat profiler is identical to the embodiment of FIG. 11, except that a thermocouple is formed on the tip of the probe.

In the embodiment of FIG. 11, as has been been described, the probe is attached to the free end of the cantilever in order to detect the inter-atomic force and the tunnel current at the same time. In the AFM heat profiler, the thermocouple is formed on the tip of the probe. Therefore, the AFM heat profiler can measure the surface temperature of any portion of a sample, while the probe-to-sample distance is kept unchanged.

More specifically, a nickel layer is coated on the tip of the tungsten probe, thus forming a thermocouple. The probe having the thermocouple is moved in the X-Y plane while applying AFM servo to a sample, thereby detecting the temperature distribution on the surface of the sample. From the temperature distribution, thus detected, the composition distribution of the sample can determined. Since the AFM servo, not STM servo, is applied to the sample to detect the temperature distribution, the surface temperature of the sample will not rise when the tunnel current flows between the prob and the sample. This results in high accuracy detection of surface temperature distribution.

An AFM STM according to a ninth embodiment of the invention, designed for use in an AFM system of the same type, as shown in FIG. 11, will now be described. The ninth embodiment is identical to the embodiment of FIG. 11, except that it is designed to detect a globulin antibody existing, in an extremely small amount, on the surface of a sample.

More specifically, an immunoglobulin antibody is modified with an anti-immunoglobulin antibody (e.g., anti-IgA antibody, anti-IgD antibody, anti-IgG antibody, anti-IgE antibody, anti-IgM antibody) to which metal colloid (particle size: about 15 nm) is bonded, thereby causing antigen-antibody reaction so that the globulin antibody is detected. Since the antigen antibody reaction is a non-covalent bond achieved by Van der Waals force or electrostatic force, the strength of the antigen-antibody bond can be evaluated by means of AFM mode measuring.

A further embodiment of the invention will be explained with reference to FIGS. 12-14.

Figure 13:
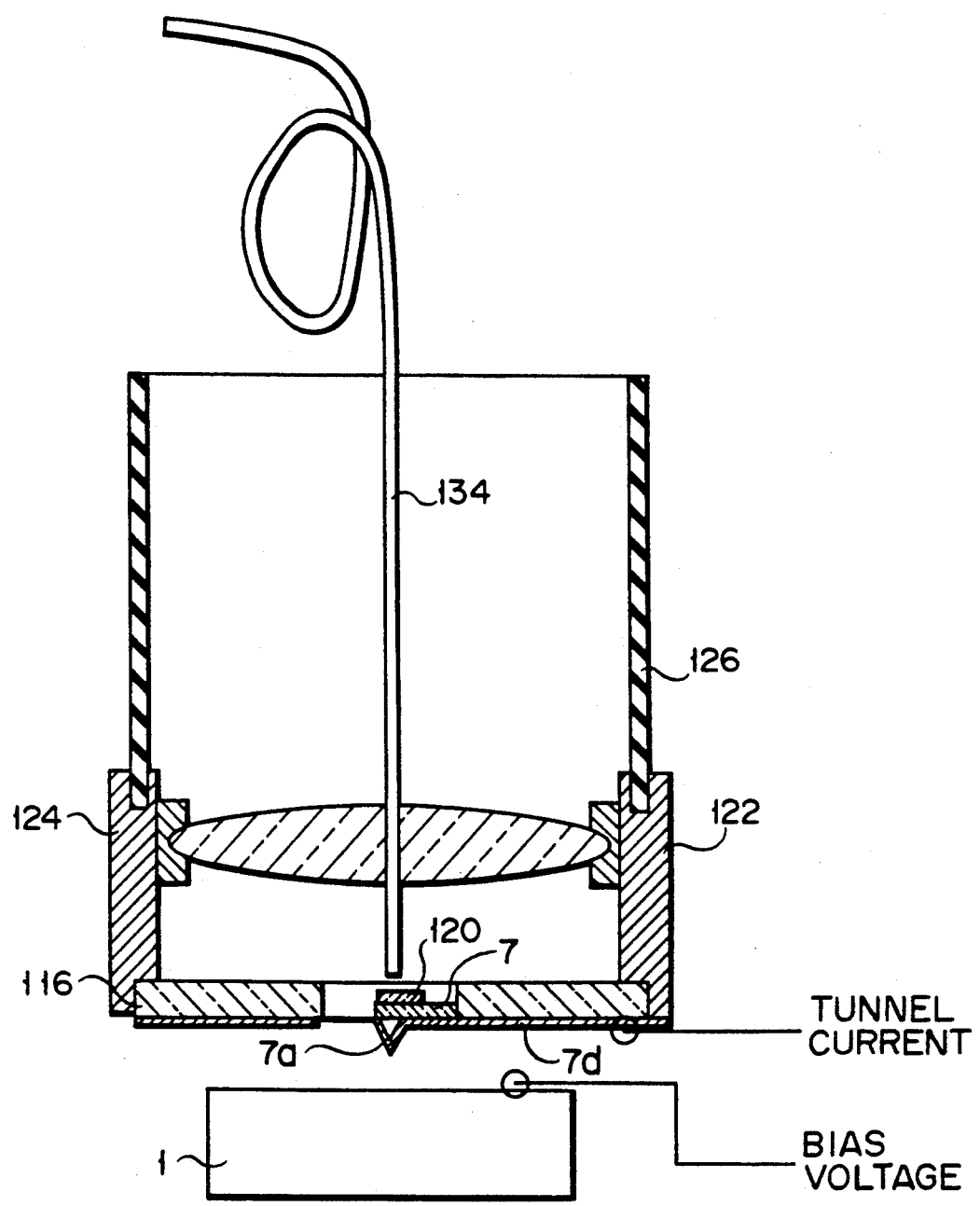
FIG. 13 is an enlarged view, showing a probe and other elements in the vicinity of the probe, which are employed in the apparatus of FIG. 12.
Figure 14:
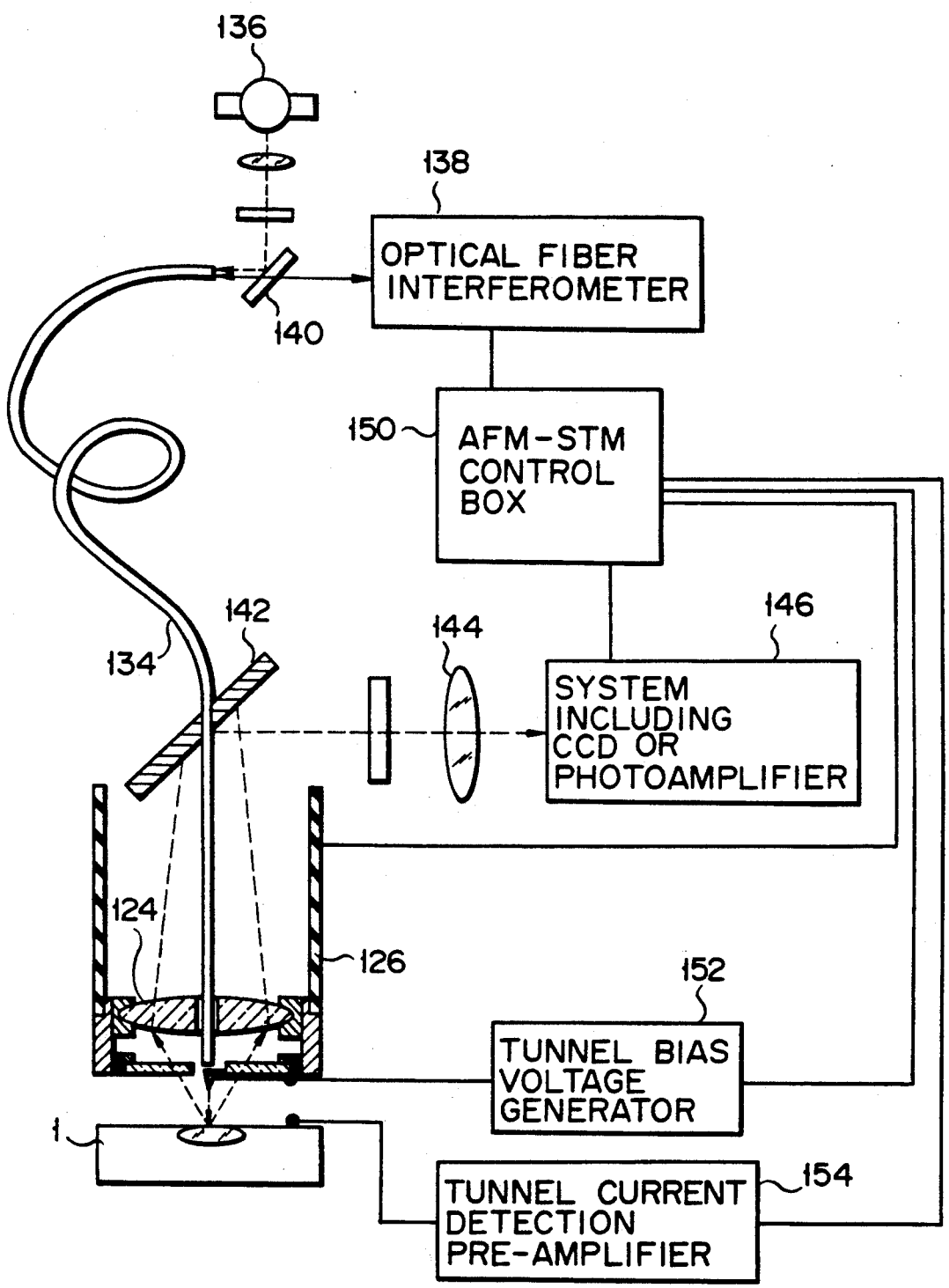
FIG. 14 is a view showing a structure incorporating a control system.

As is shown in FIG. 13, a probe 7a projects from the lower surface of a free end of a cantilever 7. The probe 7a and cantilever 7 are made of an optically transparent material such as silicon dioxide The other end of the cantilever 7 is attached to an optically transparent circular glass plate 116 having a circular opening formed at the center thereof, such that the probe 7a is located at the center of the opening. An optically transparent conductive film 7d is formed all over the lower surfaces of the probe 7a, cantilever 7, and glass plate 116. The cantilever 7 may be constructed such that only a portion to which light is applied is made of an optically transparent material, or a hole is formed in a corresponding portion. The conductive film 7d is used as an electrode for detecting a tunnel current caused to flow between the probe 7a and a sample 1 when a bias voltage is applied therebetween. An interference reflecting film 120 is provided on the upper surface of the free end of the cantilever 7 (i.e., on the side opposite to the probe 7a). The film 120 reflects displacement detection light beam and passe other light beams therethrough. The glass plate 116 and an objective lens 124 are attached coaxially to a support cylinder 122. The cylinder 122 is supported by a cylindrical piezoelectric actuator i.e., xyz direction driving mechanism 126 connected coaxially thereto. The objective lens 124 is supported by the support cylinder 122 with a movable member 124a interposed therebetween. The movable member 124a is connected to the driving mechanism 123, and can be moved electrically or manually by the same on the support cylinder 122 in the direction of the z axis or optical axis. Accordingly, the objective lens 124 can move toward the cantilever 7 in the direction of the z axis.

Figure 12:
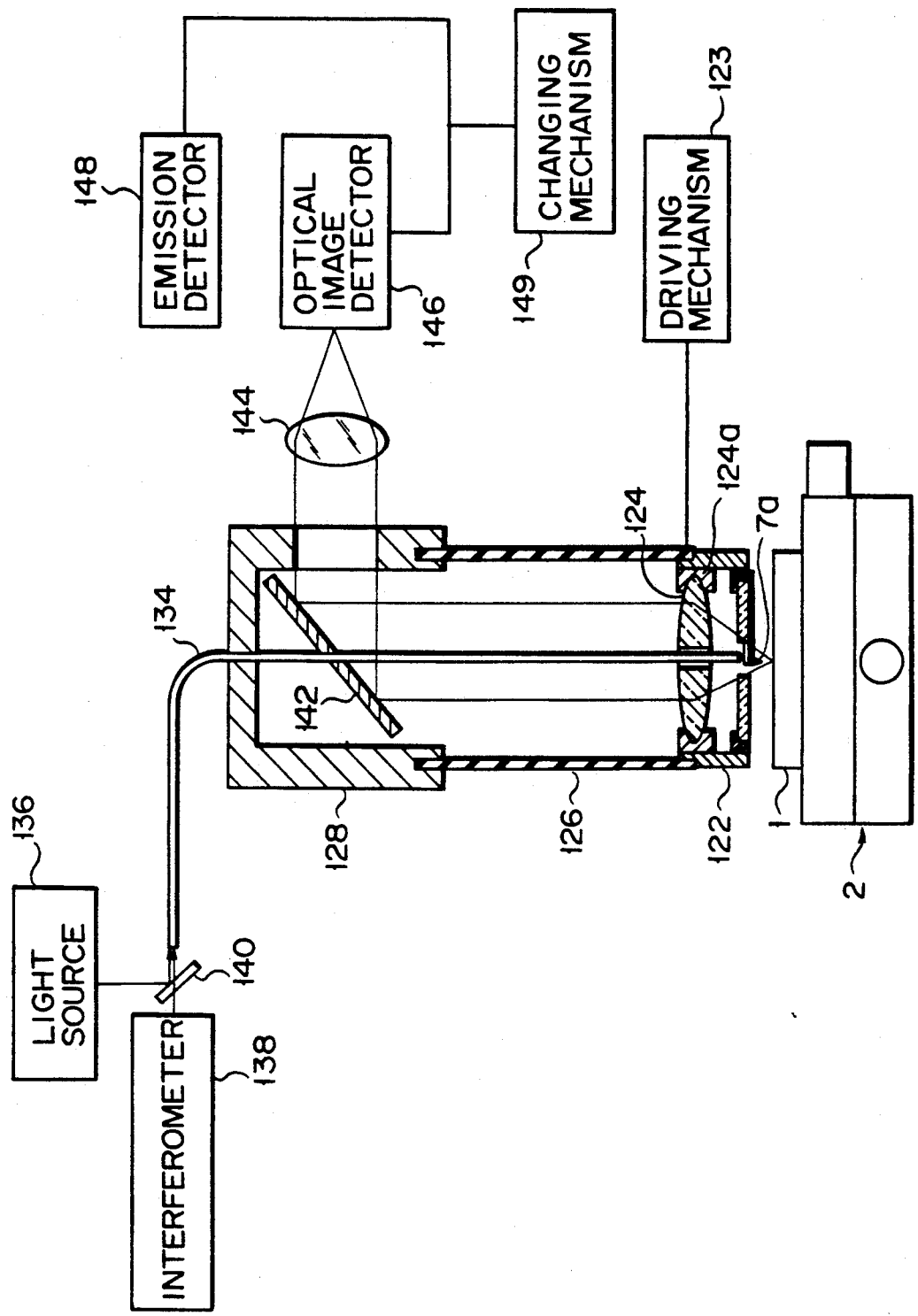
FIG. 12 is a cross sectional view, showing an interatomic force microscope according to a further embodiment of the invention.

As is shown in FIG. 12, the piezoelectric actuator 126 has its upper end portion supported by a stationary member 128, and can drive the probe 7a to scan the surface of the sample 1 placed on an XY stage 2, in the directions of the x and y axes, and also can slightly move the probe 7a in the direction of the z axis. The objective lens 124 has a hole formed therethrough at the center thereof and extending along the optical path. An optical fiber 134 has an end portion extending through the stationary member 128, a central hole formed in a reflection mirror 142, and the hole of the objective lens 124, thus reaching an area in the vicinity of the upper surface of the free end of the cantilever 7. In the vicinity of the other end portion of the fiber 134, an optical fiber interferometer 138 and an excitation light source 136 are provided, with a half mirror 140 interposed therebetween. Thus, the other end portion of the fiber 134 is supplied, through the half mirror 140, with displacement detection light emitted from the interferometer 138 and excitation light emitted from the light source 136. The displacement detection light emitted from the interferometer 138 passes through the half mirror 140, enters into the optical fiber 134, and is emitted from the end of the fiber onto the interference reflecting film 120 formed on the upper surface of the free end of the cantilever 7. The displacement detection light is then reflected by the film 120, again enters into the fiber 134, and returns to the interferometer 138. The interferometer 138 causes the emission light and returned light to interfere with each other, thereby detecting the displacement of the cantilever 7 in the z direction. On the other hand, the excitation light emitted from the excitation light source 136 is reflected by the half mirror 140, and enters into the optical fiber 134. Then, the excitation light having passed the fiber 134 passes the interference reflecting film 120, free end of the cantilever 7, probe 7a, and conductive film 7d, and reaches the surface of the sample 1. The sample 1 reflects the excitation light. The light reflected by the sample 1 is used as observation light. At the same time, the sample 1 generates examination light, such as fluorescence, depending upon the properties of the excitation light and sample 1. As the excitation light, a luminescent spectrum (365 nm, 435 nm, 546 nm, 574 nm) of mercury, or a luminescent spectrum of an ultraviolet ray such as a nitrogen laser beam or an exciter laser beam, is used so that it could be spectroscopically separated with ease from the wavelength of the displacement detection light beam emitted from a semiconductor laser. Alternatively, a light beam may be used which is obtained by spectroscopically separating white light emitted from a tungsten lamp or a xenon lamp. To detect dependence of an excited tunnel current upon time, intermittent light obtained from a pulse laser or a xenon flash lamp is used as the excitation light. The observation and examination light beams are gathered to the objective lens 124 through the central opening of the glass plate 116, and are reflected by the reflection mirror 142. The excitation light source 136 capable of emitting light, serving as examination light and also as excitation light, may be replaced with another type of light source capable of selectively emitting different examination light and excitation light. The light reflected by the reflection mirror 142 is guided to the outside through an opening formed in the peripheral wall of the stationary member 128, then is converged by a convergence lens 144, and enters into an optical image detection system 146 including a CCD or into an emission detection system 148 including a photomultiplier. The positions of these systems 146 and 148 can be selectively changed by a changing mechanism 149 to be aligned with the convergence lens 144.

Next, the procedure of performing observation will be explained. First, the objective lens 124 is moved in the direction of the z axis (perpendicular to the surface of the sample), to thereby make the lens focus on the surface of the sample 1. In this state, an observation region is determined by operating the XY stage 2 to thereby move the sample 1, while excitation light serving as observation light at this time is being emitted onto the sample surface, thereby observing an optical image thereof by using the optical image detection system 146. The probe 7a is sufficiently kept away from the sample 1 so as not to collide with the same when moved. Subsequently, the sample 1 is made to approach the probe 7a by a stepping motor (not shown), while displacement of the cantilever 7 is being monitored. Upon detecting the displacement, the stepping motor is stopped to thereby stop the movement of the sample 1. Though in the embodiment, the XY stage 2 is roughly driven in the z direction by the stepping motor incorporated therein, the motor may be connected to the stationary member 128 to roughly drive the same in the z direction. The interferometer 138 is adjusted such that displacement detection light emitted from the optical fiber 134 could be converged on the interference reflecting film 120.

Thereafter, the position of the probe 7a in the z direction is servo controlled by the piezoelectric actuator 126 so as to keep constant the amount of displacement of the cantilever 7, thereby causing the probe 7a to scan the sample surface in the x and y directions, thus measuring the unevenness of the surface (AFM measurement mode). As is shown in FIG. 14, the servo control is performed such that information indicative of displacement of the cantilever 7 supplied from the optical fiber interferometer 138 is input to an AFM-STM control box 150, which in turn supplies the piezoelectric actuator 126 with a control signal for driving the actuator so as to make the displacement be 0.

During scanning using the probe 7a with the distance between the sample 1 and probe 7a kept constant, a bias voltage can be applied between the sample and probe by means of a tunnel bias voltage generator 152, thereby detecting a tunnel current caused therebetween by a tunnel current detection pre-amplifier 154, thus measuring a change in tunnel current in the xy plane (tunnel current image measurement mode).

Further where the sample/probe distance is kept constant, the dependence of a tunnel current upon a tunnel bias voltage and the differential conductance of the tunnel current can be measured (tunnel spectrum measurement mode).

As is described above, to detect a tunnel current flowing between the probe 7a and sample 1 with the distance therebetween kept constant, excitation light is intermittently emitted onto the sample, thereby measuring the distribution of photoconductivity in the xy-plane, the dependence of an excited tunnel current upon a bias voltage, and the excited spectrum (action spectrum) of the excited tunnel current.

Thus, while the tunnel current flowing between the probe 7a and sample 1 is being detected with the distance therebetween kept constant, measurements as regards the xy-plane distribution of tunnel emission light from the sample 1, the wavelength dependence of the emission light, and the relationship between the bias voltage and emission light intensity are performed.

Figure 15:
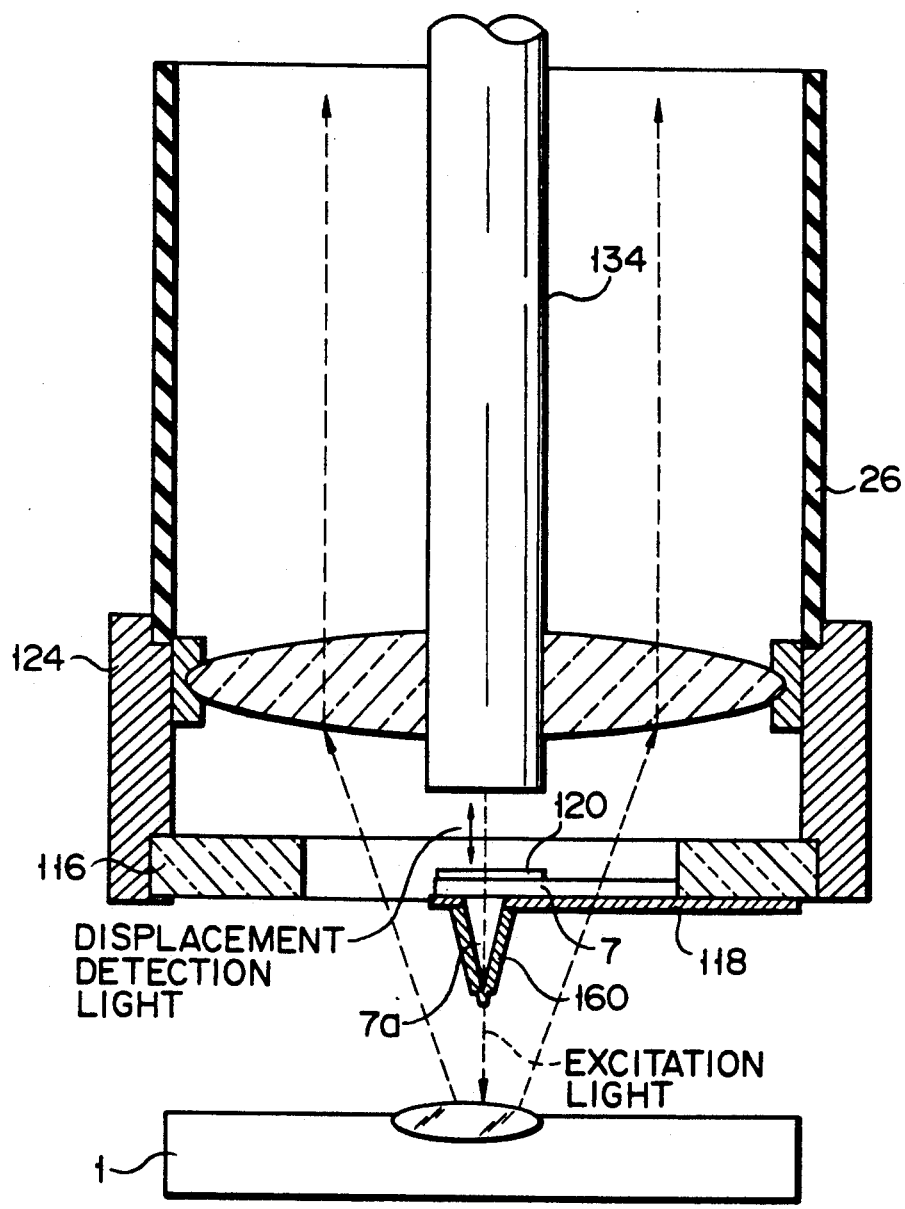
FIG. 15 is a cross sectional view showing a modification of the apparatus of FIG. 12.

FIG. 15 shows a variation of the above-described embodiment. In the figure, the same reference numerals as those in the above embodiment denote similar elements, and explanation thereof will be omitted. In this variation, an optically opaque film 160 is formed on the surface of a probe 7a except for the tip portion thereof. To observe light, such as fluorescence, emitted from the sample surface when it is excited by excitation light, it is desirable to prevent the excitation light from entering into the observation optical system. The optically opaque film 160 is made of carbon, which enhances the conductivity of the probe, and serves as a reflection film for scattering the excitation light on the surface of the probe to thereby prevent the light from entering into the probe, i.e., to prevent the light from entering into the sample observation optical system. In addition, if the refractive index distribution of the end of the optical fiber is changed by ion exchange, the same effect as in the case of forming the tip of the fiber 134 like a convex lens can be obtained. In this case, an optical fiber having a diameter larger than the width (120 &L m) of the cantilever can be used in the apparatus, thereby enhancing the resonance frequency of that portion of the fiber which is located under the fiber supporting portion.

Figure 16:
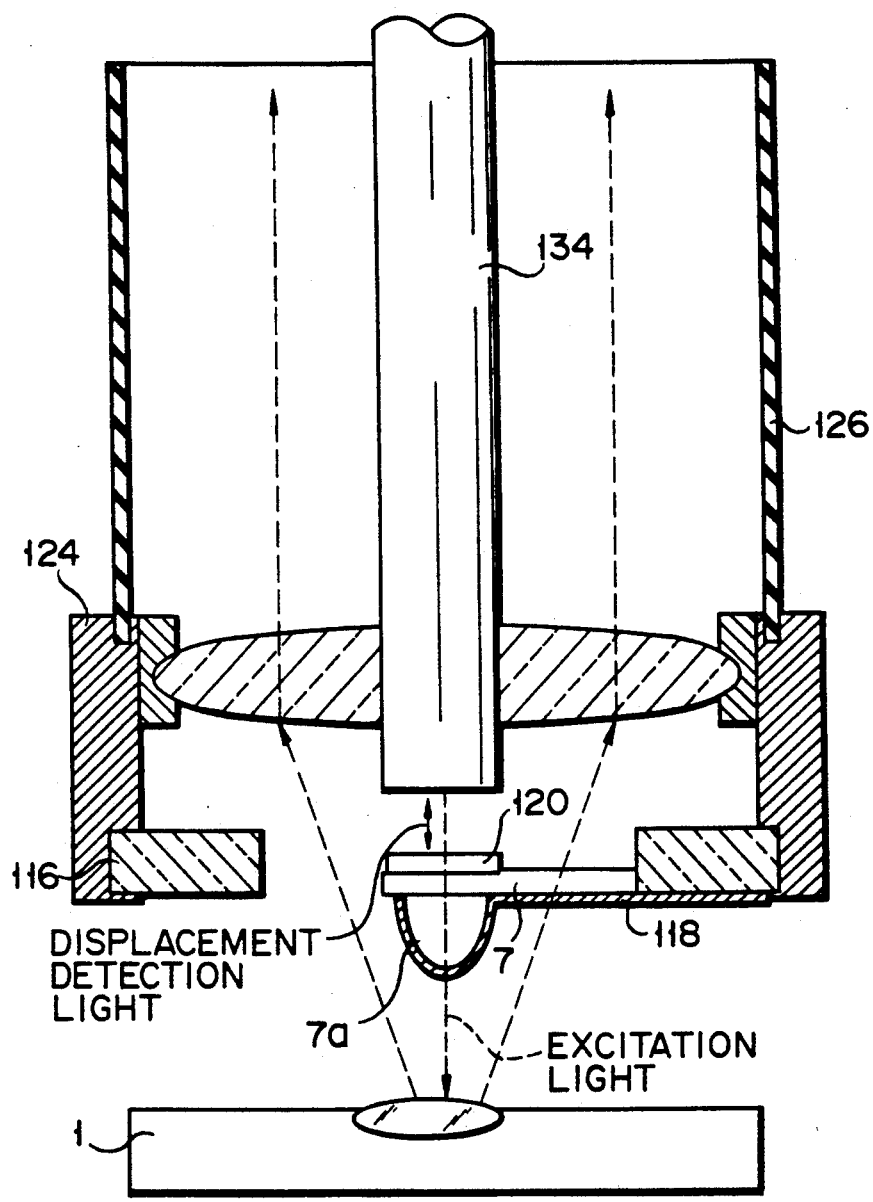
FIG. 16 is a cross sectional view, showing another modification of the apparatus of FIG. 12.

FIG. 16 shows another variation of the embodiment. In the figure, the same reference numerals as those in the above embodiment denote similar elements, and explanation thereof will be omitted. In this variation, the tip portion of a probe 7a is rounded, and has a function similar to that of a convex lens. Accordingly, excitation light is converged onto a sample 1. The same effect as above can be obtained by changing the refractive index distribution of the tip of the probe 7a, instead of rounding the same.

FIGS. 17 and 18 show further embodiments of the invention. FIG. 17 shows structural elements necessary for optically observing the sample surface, whereas FIG. 18 shows structural elements necessary for detecting light emitted from the sample surface. In FIGS. 17 and 18, the same reference numerals as those in the above embodiment denote similar elements, and explanation thereof will be omitted. In this embodiment, displacement detection light is emitted to the cantilever 7 via an optical fiber 134, and displacement of a probe 7a is detected as in the above-described embodiment. Excitation light emitted from an excitation light source 184 enters into a lens 180 via an excitation light filter 182, is then reflected by a dichroic half mirror 178, thereafter converged by an objective lens 124, and emitted onto the sample 1 through a cantilever 7 and a glass plate 116. As is shown in FIG. 17, the light reflected by the sample 1, i.e., observation light containing optical data regarding the sample surface, passes the dichroic half mirror 178, and is converged by a lens 186 into a CCD 188, where an optical image of the sample surface is observed. On the other hand, to detect the light emitted from the sample surface, a filter 190, a lens 192, and a photoamplifier 194 are provided in place of the lens 186 and CCD 188, as is shown in FIG. 18. The light emitted from the sample surface is converged by the objective lens 124, then passing the dichroic half mirror 178, entering into the lens 192 through the filter 190, and being converged into the photoamplifier 194, thereby being detected as an electrical signal. In the structure of the embodiment, though the positional resolution of the excitation light is low, the intensity of the excitation light can be increased.

Figure 19A:
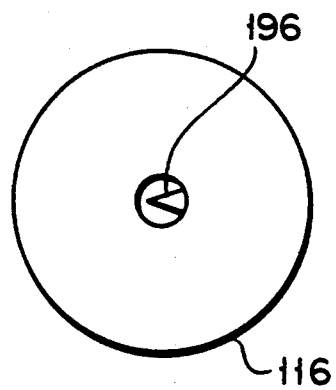
FIGS. 19A and 19B are views, showing a modification of the apparatuses of FIGS. 17 and 18.
Figure 19B:
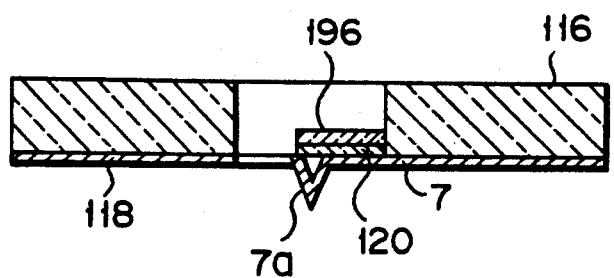

FIGS. 19A and 19B show a variation of the above embodiment. In this variation, a bolometer 196 is provided in the interference reflecting film formed on the free end of the cantilever, for monitoring the intensity of the excitation light utilizing the film's property of absorbing the excitation light. FIG. 19A is a plan view of the bolometer 196 and glass plate 116, while FIG. 19B is a cross sectional view thereof. The intensity of the excitation light can be kept constant by controlling the driving circuit of the excitation light source in a feedback manner on the basis of an output from the bolometer 196.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A microscope comprising:
   a probe;
   a cantilever having a free end portion supporting the probe;
   selective reflection means provided on the free end portion of the cantilever, for reflecting displacement detection light and for passing sample examination light therethrough;
   scanning means for causing the probe to scan the surface of a sample while controlling the distance between the probe and the sample to be substantially constant, which distance would otherwise vary due to an interatomic force exerted between the probe and the sample;
   light source means for emitting the displacement detection light and the sample examination light;
   guide means for guiding the displacement detection light and the sample examination light to the selective reflection means provided on the cantilever, the displacement detection light being reflected by the reflection means, the sample examination light passing through the reflection means and being radiated onto the surface of the sample, resulting in that a radiated portion of the surface of the sample generates characteristic light indicative of the characteristics thereof;

means for receiving light reflected by the reflection means and for detecting displacement of the free end of the cantilever; and means for detecting the characteristic light to thereby detect the characteristics of the radiated portion.

2. The microscope according to claim 1, wherein the cantilever has a portion for passing the sample examination light therethrough, and the probe is formed of an optically transparent member for passing the sample examination light therethrough.

3. The microscope according to claim 2, wherein the cantilever is formed of an optically transparent member for passing the sample examination light therethrough.

4. The microscope according to claim 3, wherein the free end portion of the cantilever has a side provided with selective reflection means and another side provided with the probe, said another side being opposed to the sample.

5. A microscope comprising:
a light source for emitting a sample examination light;
a probe having a portion for passing the sample examination light therethrough;
a cantilever having a free end portion supporting the probe, the free end portion having a portion for passing the sample examination light therethrough;
scanning means for causing the probe to scan then surface of a sample while controlling the distance between the probe and the sample on the basis of a tunnel current flowing therebetween;
guide means for guiding the sample examination light to the free end portion of the cantilever, the sample examination light passing through the free end portion of the cantilever and probe and being radiated onto the surface of the sample, resulting in that a radiated portion of the surface of the sample generates characteristic light indicative of the characteristics thereof; and
means for detecting the characteristic light to thereby detect the characteristics of the radiated portion of the surface of the sample.

6. A microscope comprising:
an optically transparent probe;
a cantilever having optically transparent free end portion supporting the probe;
selective reflection means provided on the free end portion of the cantilever, for reflecting displacement detection light and for passing observation light therethrough;
scanning means for causing the probe to scan the surface of a sample while controlling the distance between the probe and the sample to be substantially constant, which distance would otherwise vary due to an interatomic force exerted between the probe and the sample;
a light source means for emitting the displacement detection light and the observation light;
guide means for guiding the displacement detection light and the observation light to the selective reflection means provided on the cantilever, the displacement detection light being reflected by the reflection means, the observation light being radiated on the surface of the sample through the free end portion of the cantilever, and then reflected from the surface; and
means for receiving light reflected from the surface of the sample to observe the same.

7. A scanning probe microscope comprising:

a cantilever including a conductive probe having a tip portion positioned near the surface of a sample,
conveying means for conveying said sample to and away from the tip portion of the probe,
means for applying a bias voltage between said probe and sample to produce a tunnel current therebetween,
means for detecting the produced tunnel current,
means for detecting the amount of displacement of the probe resultant from interatomic forces acting between atomics of the tip portion of said probe and of the surface of the sample, and for producing signals corresponding to the detected displacement,
a main servo control means for providing said conveying means with feedback in response to the output signals from the probe displacement detection means to maintain substantially constant the distance between the tip portion of the probe and sample, thereby causing said conveying means to convey the sample,
means for forming a first three-dimensional image data of information relative to the local electron state in the surface of the sample which information has been obtained from the tunnel current detected by said tunnel current detecting means,
means for forming a second three-dimensional image data of information relative to the potential distribution in the surface of the sample, which information has been obtained from the tunnel current detected by said tunnel current detecting means; and
means for forming a third three-dimensional image data of information about the roughness of the sample surface corresponding to the amount of displacement of the probe detected by said probe displacement detecting means, so that said first, second and third image data can be separately obtained simultaneously.

8. A scanning probe microscope according to claim 7, wherein:
said bias voltage impression means includes a modulated voltage generator means for applying between the probe and the sample a modulated voltage having a determined cycle and amplitude a bias voltage, and
said means for forming said first three-dimensional image data includes an arithmetic means for outputting differential conductances of the tunnel current detected by said tunnel current detecting means and said modulated voltage.

9. A scanning probe microscope according to claim 8, wherein:
said second three-dimensional image data forming means includes a potential servo means for producing a voltage adapted to shift the potential of the bias voltage applied to the sample by integrating the tunnel current detected by said tunnel current detecting means.

10. A scanning probe microscope according to claim 7, wherein:
said cantilever has one plane on which said probe is mounted, another plane, and a conductive film attached to the another plane, and
said probe displacement detecting means comprises a tunnel tip provided near the conductive film of said cantilever,
and further comprising:

an auxiliary bias voltage applying means for applying a bias voltage between the tunnel tip and the conductive film to produce a tunnel current flow between the tunnel tip and the conductive film, and an auxiliary tunnel current detection means for detecting the tunnel current flow produced by the bias voltage applied by said auxiliary bias voltage applying means, so that the amount of current flow of said probe may be detected in accordance with the tunnel current detected by the auxiliary tunnel current detection means.

11. A scanning probe microscope according to claim 10, wherein:

said cantilever includes a plate like electrically insulated member having one plane and another plane, a conductive member for connection of said probe and said auxiliary tunnel current detection means when said probe is provided on said one plane and said conductive film is provided on said another plane, and means for connecting said conductive film to ground.

12. A scanning probe microscope according to claim 11, which further comprises a logarithm arithmetic means for finding the tunnel current flow detected by said auxiliary tunnel current detection means and for computing the distance between the tunnel tip and conductive film.

13. A scanning probe microscope according to claim 7, wherein said first three-dimensional image data forming means and said second three-dimensional image forming means comprise arithmetic means for performing a digital arithmetic process on the tunnel current detected by the tunnel current detecting means to produce respective first and second three-dimensional image data.

14. A scanning probe microscope according to claim 7, further comprising:

an auxiliary servo control means for providing said conveying means with feedback in response to the tunnel current detected by said tunnel current detecting means so as to maintain substantially constant the distance between the probe and sample, thereby causing said conveying means to convey the sample; and connection switching means for executing selective connections of the auxiliary servo control means and said first-mentioned servo control means with said conveying means.

15. The microscope according to claim 2, wherein the cantilever is formed of an optically transparent member at portions thereof for passing reflected characteristic light therethrough.

16. A microscope comprising:

a cantilever including a free end portion and a probe provided on the free end portion;

light emitting means for emitting a sample examination light onto a surface of a sample through the probe so that a portion of the surface of the sample onto which light is emitted generates characteristic light thereof;

scanning means for causing the probe to scan the surface of a sample while controlling the distance between the probe and the surface of the sample to be substantially constant on the basis of an interatomic force exerted between the probe and sample; and means for detecting the characteristic light generated by the sample to thereby detect the characteristics of said portion of the surface of the sample onto which said sample examination light is emitted.

17. The microscope according to claim 16, wherein said probe has a transparent tip through which sample examination light is emitted onto said sample surface.

18. A microscope comprising:

a lever means including a flexible portion and a probe provided on the flexible portion;

light emitting means for emitting a sample examination light onto a surface of a sample through the probe so that a portion of the surface of the sample onto which light is emitted generates characteristic light thereof;

scanning means for causing the probe to scan the surface of a sample while controlling the distance between the probe and the surface of the sample to be substantially constant on the basis of an interatomic force exerted between the probe and sample; and means for detecting the characteristic light generated by the sample to thereby detect the characteristics of the portion of the surface of the sample onto which said sample examination light is emitted.

19. The microscope according to claim 18, wherein:

said light emitting means includes a light source for emitting the sample examination light, and a guide means for guiding the sample examination light from the light source onto the flexible portion of the lever means; and said lever means includes transparent portions at said flexible portion thereof and transparent portions of said probe portion through which said sample examination light passes and is radiated onto said sample surface portion.

* * * * *